(12) United States Patent
Lessieux

(10) Patent No.: US 7,307,630 B2
(45) Date of Patent: Dec. 11, 2007

(54) VOLUME RENDERING APPARATUS AND METHOD

(75) Inventor: Laurent Lessieux, Edinburgh (GB)

(73) Assignee: Barco NV, Kortrijk (BE)

( * ) Notice: Subject to any disclaimer, the term of this patent is extended or adjusted under 35 U.S.C. 154(b) by 131 days.

(21) Appl. No.: 11/212,468

(22) Filed: Aug. 26, 2005

(65) Prior Publication Data
US 2007/0046685 A1    Mar. 1, 2007

(51) Int. Cl.
G06T 17/00    (2006.01)

(52) U.S. Cl. .................................................. 345/424

(58) Field of Classification Search ................ 345/424
See application file for complete search history.

(56) References Cited

U.S. PATENT DOCUMENTS

| | | | | |
|---|---|---|---|---|
| 4,930,091 A | * | 5/1990 | Schroeder et al. | 345/421 |
| 5,113,490 A | * | 5/1992 | Winget | 345/419 |
| 5,570,460 A | * | 10/1996 | Ramanujam | 345/424 |
| 5,831,623 A | * | 11/1998 | Negishi et al. | 345/424 |
| 6,222,556 B1 | * | 4/2001 | Penna | 345/629 |
| 6,628,281 B1 | * | 9/2003 | Fossum et al. | 345/422 |

* cited by examiner

Primary Examiner—Ulka Chauhan
Assistant Examiner—Jason M Repko
(74) Attorney, Agent, or Firm—Renner, Otto, Boiselle & Sklar, LLP

(57) ABSTRACT

An apparatus for rendering a two dimensional polygon image from volume data defining a volume and plane data defining a two dimensional plane which intersects the volume. The apparatus comprises a graphics processing unit (GPU). The apparatus is operable to generate triangle data comprising an indirect representation of each triangle of a set of candidate triangles. For a given plane/volume interaction a subset of the candidate triangles are valid triangles which are within the volume and on the given plane and the remaining triangles are invalid triangles. The GPU is operable to process the indirect representation of each triangle of the set of candidate triangles to output for a valid triangle for the defined plane a direct representation of the valid triangle and to output for an invalid triangle for the defined plane a direct representation of a degenerate triangle. The GPU is operable to reject each direct representation of a degenerate triangle from further processing. The GPU is also operable to process each direct representation of a valid triangle to form one or more triangle images which form the two dimensional polygon image.

38 Claims, 16 Drawing Sheets

| C1 | C2 | C3 | C4 | Valid | Line |
|---|---|---|---|---|---|
| 0 | 0 | 0 | 0 | (Y) | Line 1 |
| 0 | 0 | 0 | 1 | Y | Line 2 |
| 0 | 0 | 1 | 0 | Y | Line 3 |
| 0 | 0 | 1 | 1 | Y | Line 4 |
| 0 | 1 | 0 | 0 | Y | Line 5 |
| 0 | 1 | 0 | 1 | N | — |
| ⋮ | ⋮ | ⋮ | ⋮ | ⋮ | ⋮ |

VOLUME RENDERING APPARATUS AND METHOD

BACKGROUND OF INVENTION

This invention relates to volume rendering, in particular to rendering a two dimensional polygon image from volume data defining a volume and plane data defining a two dimensional plane which intersects the volume. More particularly the invention relates to volume rendering using a computer system that includes a graphics processing unit (GPU).

Volume rendering is a method of displaying two dimensional (2D) representations of three-dimensional (3D) data sets. An introduction to volume rendering is given in Lichtenbelt et al. "Introduction to Volume Rendering", Hewlett-Packard Company, Prentice-Hall PTR, New Jersey, 1998 [1] which is incorporated herein in its entirety by reference.

Volume rendering is used in the field of medical imaging where the 3D data sets of voxels can be collected by medical imaging equipment, such as computer-assisted tomography (CT) scanners, magnetic resonance scanners and positron-emission-tomography (PET) systems. These 3D data sets are sometimes referred to as volume data. In the early days of medical imaging, rendering of volume data was performed on vendor-specific software and hardware associated with the scanner. However, for a number of years, application software to implement volume rendering on general purpose computers, for example standard personal computers and workstations, which does not utilize any bespoke hardware has been well known.

Medical volume rendering is highly computationally intensive and the processing power of a modern general purpose computer's central processing unit (CPU) is often inadequate for performing the task at an acceptable speed.

Modern personal computers and workstations generally include a graphics card, and in most cases the graphics card includes a Graphics Processing Unit (GPU). In terms of aggregate processing power, modern GPUs typically outperform a computer's CPU by roughly an order of magnitude.

Although not originally designed with this use in mind, GPUs do have sufficient general programmability that they can be applied to the task of volume rendering, in particular, to volume rendering in medicine where the task is usually to render images of the internal organs of human patients. However, while the GPU might have sufficient raw computing power to perform medical image rendering, it is nonetheless a difficult task to implement a practical GPU-based medical image renderer.

A common technique in volume rendering is to define one or more 2D planes, sometimes called imaging planes, which are parallel to a projection plane and to render the intersection of the imaging plane or planes with the volume of the volume data. This volume is sometimes referred to as the volume of interest. In general, an imaging plane will be oblique to the axes of the volume, which typically, but not necessarily, is a right parallelepiped (e.g. a cube). The intersection of an imaging plane with a right parallelepiped volume will be an irregular polygon of three to six sides. The geometry of this polygon varies as the location and the orientation of the plane relative to the volume of interest changes, and thus generally needs to be re-computed for every frame being rendered. The process of determining the geometry of this polygon is sometimes referred to as clipping.

It should be noted that clipping a polygon is not strictly needed to generate a correct volume rendering, but is useful for efficiency reasons. A correct rendering could be generated by providing a polygon that extends beyond the volume and checking in a later stage of the GPU (typically the pixel shader stage) that each interior point of the polygon is within the volume. However, this would be inefficient because it would involve processing redundant points which can be avoided by clipping the polygon.

A typical GPU offers six clipping planes as a hardware capability and the GPU can clip the geometry to be rendered efficiently using these planes. One way of determining the intersection of a plane with a volume of interest is to set the GPU clipping planes to match the faces of the volume, defining each imaging plane to extend beyond the volume, and to allow the GPU to clip the imaging planes. The main shortcoming of this simple technique is that it has been observed that changing the GPU clipping planes stalls the operation of the GPU and it is therefore an inefficient operation to do frequently. It is a common requirement of volume rendering to render a volume of interest not as a single volume but as a plurality of sub-volumes or blocks. This requirement may arise for storage optimization reasons or to avoid processing empty (transparent) regions of the volume. Processing these blocks would require switching the GPU clipping frames to render each block and this would be inefficient.

There are other reasons not to use the GPU clipping planes to render the two dimensional polygon image and these include that a typical GPU only supplies six clipping planes and that the GPU clipping planes may be committed to other uses, for example some GPU clipping planes may be used to implement additional clipping primitives controlled by the user (so the volume of interest is no longer a parallelepiped but an irregular solid).

The present invention is concerned with rendering a two dimensional polygon image from volume data defining a volume and plane data defining a two dimensional plane which intersects the volume. The invention seeks to provide an apparatus and method to render the two dimensional polygon image using the processing abilities of a GPU, but without requiring the use of the GPU clipping planes.

SUMMARY OF THE INVENTION

According to a first aspect of the invention, there is provided an apparatus for rendering a two dimensional polygon image from volume data defining a volume and plane data defining a two dimensional plane which intersects the volume, the apparatus comprising a graphics processing unit (GPU), wherein:

(a) the apparatus is operable to generate triangle data comprising an indirect representation of each triangle of a set of candidate triangles, wherein for a given plane/volume interaction a subset of the candidate triangles are valid triangles which are within the volume and on the given plane and the remaining triangles are invalid triangles;

(b) the GPU is operable to process the indirect representation of each triangle of the set of candidate triangles to output for a valid triangle for the defined plane a direct representation of the valid triangle and to output for an invalid triangle for the defined plane a direct representation of a degenerate triangle;

(c) the GPU is operable to reject each direct representation of a degenerate triangle from further processing; and (d) the GPU is operable to process each direct representation of a valid triangle to form one or more triangle images which form the two dimensional polygon image.

Operations (c) and (d) are operations within the existing processing ability of a typical GPU. That is to say, this happens automatically in a typical GPU.

A typical GPU can be configured or programmed to perform operations. In embodiments of the present invention, the GPU is configured to perform operation (b).

By generating the triangle data and configuring the GPU to process the indirect representation of each candidate triangle to output either a direct representation of a triangle (for a valid triangle for the defined plane) or a direct representation of a degenerate triangle (for an invalid triangle for the defined plane), the existing processing ability of a typical GPU can be used to render a polygon image. Advantageously, operations (b), (c) and (d) can be performed to render the polygon image for any defined plane. For the particular defined plane/volume interaction, a particular subset of the candidate triangles are valid triangles.

The direct representation of each triangle may comprise a group of three output vertices, the output vertices for a valid triangle comprising three different values (or points) defining the corners of the triangle and the output vertices for an invalid triangle comprising at least two identical values (or points), and the GPU may be operable to perform operations (c) and (d) by:

(i) rejecting a group of three vertices comprising at least two identical values; and (ii) forming a triangle image from a group of three vertices comprising three different values.

Operations (i) and (ii) are operations within the existing processing ability of a typical GPU. By configuring the GPU to process the indirect representation of each candidate triangle to output such output vertices, the existing processing ability of a typical GPU can be used to render a polygon image.

Thus, it will be appreciated that in embodiments of the present invention the GPU is configured to take advantage of an automatic function of a typical GPU. Specifically, the GPU is configured to process the indirect representation of an invalid triangle to output the coordinates of a degenerate triangle (i.e. one which has two coincident vertices) so that this degenerate triangle is automatically rejected by the GPU.

In embodiments of the invention the GPU calculates the coordinates of the corners of the one or more triangles which form the two dimensional polygon formed by the intersection of the defined plane with the volume. The GPU then renders the polygon image formed by the valid triangles but automatically rejects the invalid triangles. One advantage of this method is that all of the processing required to determine the valid triangle coordinates is performed by the GPU and the load on the CPU is low.

A typical GPU comprises a vertex unit, a rasterizer, and a pixel unit. It is typically the vertex unit which can be programmed and typically the rasterizer that has the built in behaviour to reject degenerate triangles.

Accordingly, in one embodiment the GPU comprises a vertex unit. The indirect representation of each triangle may comprise a group of three input vertex definitions, each input vertex definition defining a line on or through the volume (e.g. an edge of the volume or a diagonal line between opposite corners of a volume). For a valid triangle for a given plane/volume interaction the line defined by each input vertex definition intersects the plane. The vertex unit may be operable to process each input vertex definition of a valid triangle for the defined plane to output a respective output vertex by calculating and outputting the intersection point of the defined plane and the line defined by the input vertex definition.

For an invalid triangle for a given plane/volume interaction the line defined by at least one of the group of three input vertex definitions does not intersect the plane.

Modern vertex units may be configured or programmed with a vertex program (sometimes called a "vertex shader"). The typical processing ability of a vertex unit of a GPU is to process only one vertex at a time. Typically this processing involves transforming a single input vertex (i.e. a single coordinate or point) into a single output vertex (i.e. a single coordinate or point). The conventional programming model for vertex programs, therefore, is to process only one vertex at a time—i.e. the conventional approach is to use a vertex unit to process a direct representation of a single vertex. Conventionally, therefore, vertex programs do not support the notion of edges or triangles. This represents a limitation on the operations which a vertex unit can be programmed to perform.

Providing an input vertex definition defining a line on or through the volume represents a significant departure from the conventional way of programming vertex units, as does configuring the vertex unit (typically using a vertex program) to be operable to process each input vertex definition of a valid triangle for the defined plane to output a respective output vertex by calculating and outputting the intersection point of the defined plane and the line defined by the input vertex definition. This approach overcomes the limitation of the conventional programming model for vertex programs since it allows a vertex program to support the notion of edges or triangles.

An input vertex definition of embodiments of the present invention is processed by the vertex unit to output a single output vertex. The input vertex definition defines at least one line on or through the volume. One of these lines is an indirect representation of the single output vertex in that for a valid triangle the line intersects the plane and the single output vertex is the intersection point between the line and defined plane. For an invalid triangle, at least one of the group of three input vertex definitions defines a line which does not intersect the defined plane and a predetermined value is output as the single output vertex.

Each input vertex definition may define the positions of a first and second pair of corners of the volume, each defining a line on or through the volume and the vertex unit may be operable to process each input vertex definition in turn to output a respective output vertex by:

(i) checking if the line between the first pair of corners intersects the plane;

(ii) checking if the line between the second pair of corners intersects the plane;

(iii) if checks (i) and (ii) determine that both lines intersect the plane, then calculating and outputting as the output vertex the intersection point for the first pair of corners; and (iv) if checks (i) and (ii) determine that at least one of the lines does not intersect the plane then outputting as the output vertex a predetermined value.

An input vertex definition defining the positions of a first and second pair of corners of the volume (and thereby the lines between the corners of each pair) comprises, for a valid triangle, an indirect representation of each of two output vertices (i.e. a line for each of two output vertices). Accordingly, the vertex unit can be programmed to perform operations which involve the two lines, such as operations (i) and (ii) above, although only a single output vertex is output. Again this is a significant departure from the conventional way of programming vertex units.

The vertex unit may be operable to perform three iterations of operations (i) to (iv) to output a group of three output vertices, one iteration for each of the group of three input vertex definitions.

In a particular embodiment a first input vertex definition defines the positions of a first pair of corners defining a line along a first edge of a face of the volume and the positions of a second pair of corners defining a line along a second edge of the face of the volume; a second input vertex definition defines the positions of a first pair of corners defining the line along the second edge and the positions of a second pair of corners defining the line along the first edge; and a third input vertex definition defines the positions of a first pair of corners defining the line between opposite corners of the volume and the positions of a second pair of corners defining the same line. Advantageously, the same vertex program can be used for each iteration.

In another embodiment, the third input vertex definition may be a more direct representation of a point M within the volume.

The indirect representation of each candidate triangle may comprise a group of three input vertex definitions and each input vertex definition may be in a flexible vertex format (FVF). The FVF is intended to be used to contain coordinates for texture, colour, shading, etc. In embodiments of the present invention the FVF is used to define a line or two lines on or through the volume, again breaking with convention.

In a particular embodiment the volume is in the shape of a right parallelpiped, but other shapes may be processed such as an oblique parallelepiped.

The GPU may have a GPU memory and the apparatus may be operable to transfer the data representing the plane to the GPU memory as a constant. The use of the plane data as a constant means that this data can be stored as a vertex program constant.

The apparatus may be operable to notionally divide the volume data into a plurality of sub-volume data sets and may be further operable to render a two dimensional polygon image for each sub-volume data set as is a common requirement for volume rendering.

According to a second aspect of the invention, there is provided an apparatus for rendering a two dimensional polygon image from volume data defining a volume and plane data defining a two dimensional plane which intersects the volume, the apparatus comprising a graphics processing unit (GPU), wherein:

(a) the apparatus is operable to generate polygon data comprising for each topologically possible plane/volume interaction (i) a corner data set indicating for each corner of the volume whether the corner is one side or the other side of the plane and (ii) an indirect representation of the polygon formed by the plane/volume interaction;

(b) the apparatus is operable to determine the corner data set for the defined plane/volume interaction and to use it as a key to identify the corresponding indirect representation of a polygon from the polygon data;

(c) the GPU is operable to process the identified indirect representation of a polygon to output a direct representation of the polygon; and (d) the GPU is operable to process the direct representation of the polygon to form the two dimensional polygon image.

Each indirect representation of a polygon defines the edges that the polygon intersects, and is thereby applicable to a set of polygons, each of any specific location and orientation provided it intersects these edges. Consequently, the indirect representation of a polygon represents a set of planes, each of which intersects the defined edges. Different indirect representations of different polygons are those which define different intersected edges i.e. those which have different corner data sets.

The indirect representation of each polygon may comprise an indirect representation of one or more triangles which form the polygon, and the GPU may be operable to perform operations (c) and (d) by processing the indirect representation of each triangle of the identified indirect representation of a polygon.

The indirect representation of each triangle may comprise a group of three input vertex definitions. Each input vertex definition defines the positions of a pair of corners of the volume which define a line along an edge of the volume.

The GPU may comprises a vertex unit which is operable to process each input vertex definition in turn to output a respective output vertex by calculating and outputting the intersection point of the defined plane and the line defined by the input vertex definition.

Advantageously, in embodiments of the second aspect of the invention the GPU only process valid triangles and this avoids saturation of the vertex unit.

The apparatus may be operable to generate the polygon data for each topologically possible plane/volume interaction by:

(a) generating a set of all possible corner data sets comprising a mathematical representation of each mathematically possible combination of corners of the volume being one side or the other side of the plane, and (b) processing the set of all possible corner data sets to determine which of the corner data sets represent topologically possible plane/volume interactions and which of the corner data sets represent topologically impossible plane/volume interactions. However, this operation need only be performed once and may be performed by another apparatus, for example, with the set of corner data sets being provided to the apparatus as a data file.

In a particular embodiment the corner data set is an array of elements. Each element represents a corner and stores either an indicator that the corner is one side of the plane or an indicator that the corner is the other side of the plane.

The indirect representation of each polygon may comprise an indirect representation of one or more triangles which form the polygon. The indirect representation of each triangle may comprise a group of three input vertex definitions. In a particular embodiment each input vertex definition is in a flexible vertex format (FVF). As mentioned above, the FVF is intended to be used to contain coordinates for texture, colour, shading, etc and using the FVF to define a line breaks with convention.

The volume may be in the shape of a right parallelpiped, but other shapes may be processed such as an oblique parallelepiped.

In one embodiment the GPU has a GPU memory and the apparatus is operable to transfer the data representing the plane to the GPU memory as a constant. The use of the plane data as a constant means that this data can be stored as a vertex program constant.

The apparatus may be operable to notionally divide the volume data into a plurality of sub-volume data sets and the apparatus may be operable to render a two dimensional polygon image for each sub-volume data set as is a common requirement for volume rendering.

The apparatus of the first and second aspects of the present invention may further include a display for displaying the rendered image to a user. Alternatively, the rendered image may be stored for later retrieval.

According to a third aspect of the invention, there is provided a method of using an apparatus comprising a graphics processing unit (GPU) to render a two dimensional polygon image from volume data defining a volume and plane data defining a two dimensional plane which intersects the volume, the method comprising:

(a) generating triangle data comprising an indirect representation of each triangle of a set of candidate triangles, wherein for a given plane/volume interaction a subset of the candidate triangles are valid triangles which are within the volume and on the given plane and the remaining triangles are invalid triangles;

(b) using the GPU to process the indirect representation of each triangle of the set of candidate triangles to output for a valid triangle for the defined plane a direct representation of the valid triangle and to output for an invalid triangle for the defined plane a direct representation of a degenerate triangle;

(c) using the GPU to reject each direct representation of a degenerate triangle from further processing; and (d) using the GPU to process each direct representation of a valid triangle to form one or more triangle images which form the two dimensional polygon image.

According to a fourth aspect of the invention there is provided a method of using an apparatus comprising a graphics processing unit (GPU) to render a two dimensional polygon image from volume data defining a volume and plane data defining a two dimensional plane which intersects the volume, the method comprising:

(a) generating polygon data comprising for each topologically possible plane/volume interaction (i) a corner data set indicating for each corner of the volume whether the corner is one side or the other side of the plane and (ii) an indirect representation of the polygon formed by the plane/volume interaction;

(b) determining the corner data set for the defined plane/volume interaction and using it as a key to identify the corresponding indirect representation of a polygon from the polygon data;

(c) using the GPU to process the identified indirect representation of a polygon to output a direct representation of the polygon; and (d) using the GPU to process the direct representation of the polygon to form the two dimensional polygon image.

According to a fifth aspect of the invention there is provided a computer program product comprising machine readable instructions for implementing the method of the third aspect of the invention. The computer program product may comprise a computer program on a carrier medium, for example, a storage medium or a transmissions medium.

According to a sixth aspect of the invention there is provided a computer configured to perform the method of the third aspect of the invention.

According to a seventh aspect of the invention there is provided a computer program product comprising machine readable instructions for implementing the method of the fourth aspect of the invention. Again, the computer program product may comprise a computer program on a carrier medium, for example, a storage medium or a transmissions medium.

According to an eighth aspect of the invention there is provided a computer configured to perform the method of the fourth aspect of the invention.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
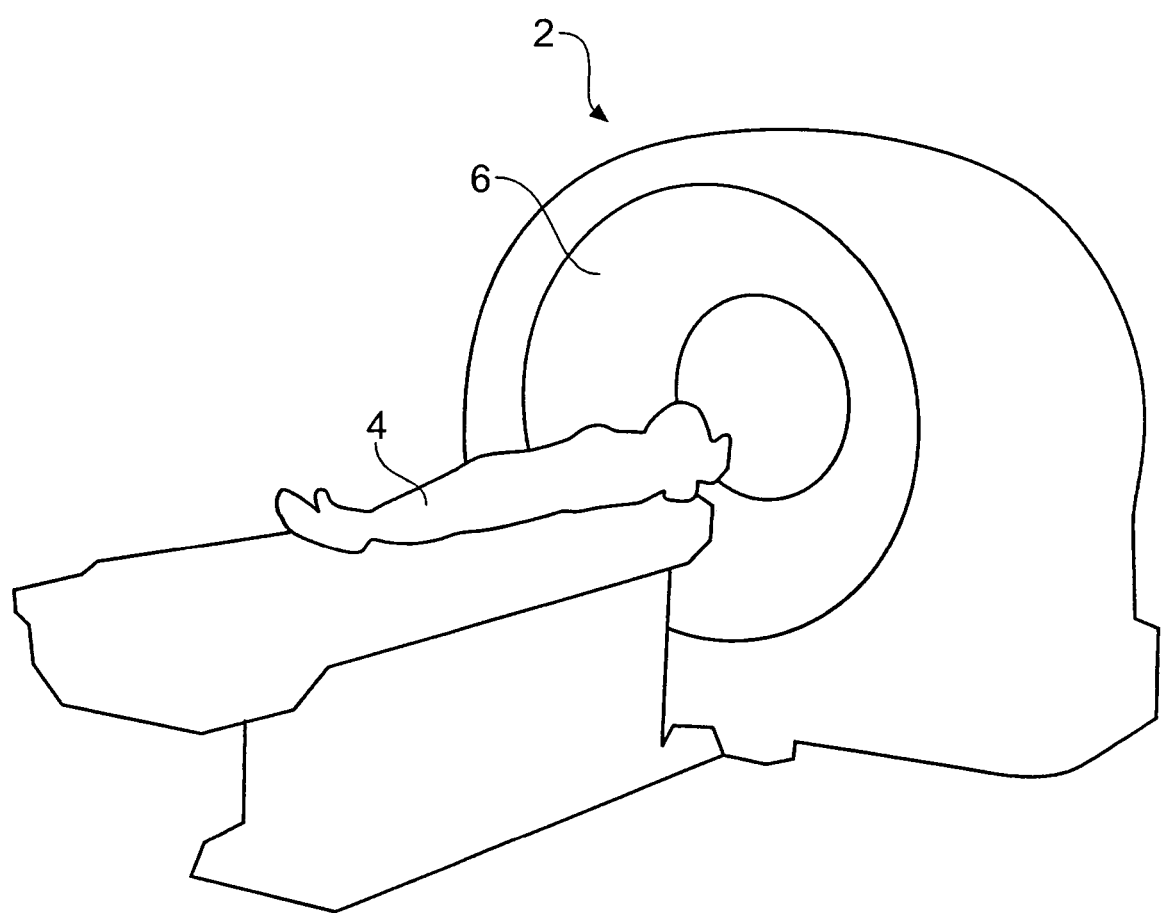
FIG. 1 shows a generic magnetic resonance scanner for generating volume data.

FIG. 1 is a schematic perspective view of a generic MR scanner 2 for obtaining a 3D scan of a region of a patient 4. An anatomical feature of interest (in this case a head) is placed within a circular opening 6 of the MR scanner 2 and a series of imaging slices through the patient is taken. Raw image data are derived from the MR scanner and could comprise a collection of one thousand 2D 512×512 data subsets, for example. These data subset, each representing a slice of the region of the patient being studied, are combined to produce volume data. The volume data comprise a collection of voxels each of which corresponds to a pixel in one of the slices. Thus the volume data are a 3D representation of the feature imaged and various user selected 2D projections (output images) of the 3D representation can be displayed (typically on a computer monitor).

Different imaging modalities (e.g. CT, MR, PET, ultrasound) typically provide different image resolutions (i.e. voxel size), and the overall size of the volume imaged will further depend on the nature of the study. For embodiments of the present invention the volume data may comprise an array of any number of voxels and may be processed as a whole volume or in a number of sub-volumes data sets or blocks. For example the volume data may comprise an array of 512×512×1024 16 bit voxels arranged on a Cartesian grid defined by x-, y- and z-axes, with the voxels being spaced by 0.5 mm along each axis. This corresponds to an overall imaged volume of around 25 cm×25 cm×50 cm, for example so as to encompass a human head. The volume data are aligned with three planes which are conventionally the transverse (xy), sagittal (yz) and coronal (xz) planes.

Typically the volume data is rendered in a user-selected 2D plane. Depending on the application, the volume data may be rendered for several 2D planes in turn, but for the purposes of the present application the description will be given to render an image in a single 2D plane, it being appreciated that several iterations of the described techniques could be performed as required for a particular application.

Figure 2:
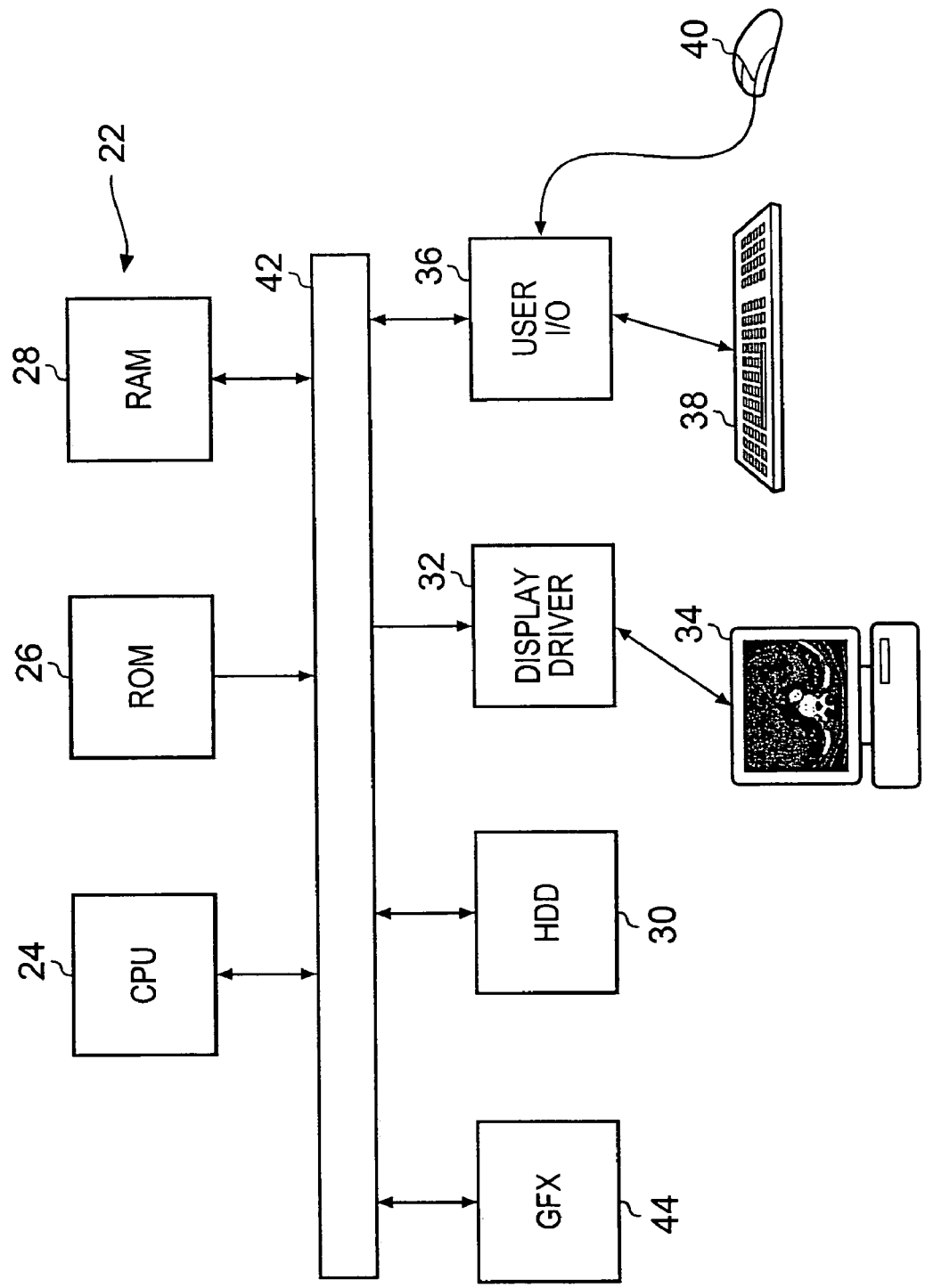
FIG. 2 schematically shows a general purpose system for processing volume data to generate two dimensional images in accordance with an embodiment of the invention.

FIG. 2 schematically illustrates a general purpose computer system 22 configured to perform processing of volume data to generate two dimensional images in accordance with an embodiment of the invention. The computer 22 includes a central processing unit (CPU) 24, a read only memory (ROM) 26, a random access memory (RAM) 28, a hard disk drive 30, a display driver 32 and a display 34 and a user input/output (IO) circuit 36 with keyboard 38 and mouse 40. These devices are connected via a common bus 42. The computer also includes a graphics card 44 connected via the common bus 42. In this example, the graphics card is a Radeon X800XT visual processing unit manufactured by ATI Technologies Inc., Ontario Canada. The graphics card includes a graphics processing unit (GPU) and random access memory tightly coupled to the GPU (GPU memory) (not shown in FIG. 2).

The CPU 24 may execute program instructions stored within the ROM 26, the RAM 28 or the hard disk drive 30 to carry out processing of signal values associated with voxels of volume data that may be stored within the RAM 28 or the hard disk drive 30. The RAM 28 and hard disk drive 30 are collectively referred to as system memory. The GPU comprises several units (not illustrated) including a programmable vertex unit which is operable to execute program instructions of a vertex program to process an input vertex to output a respective output vertex. As already discussed, the conventional programming model for vertex programs is to process only one vertex at a time and typically this processing involves transforming a single input vertex (i.e. a single coordinate or point) into a single output vertex (i.e. a single coordinate or point).

Figure 3:
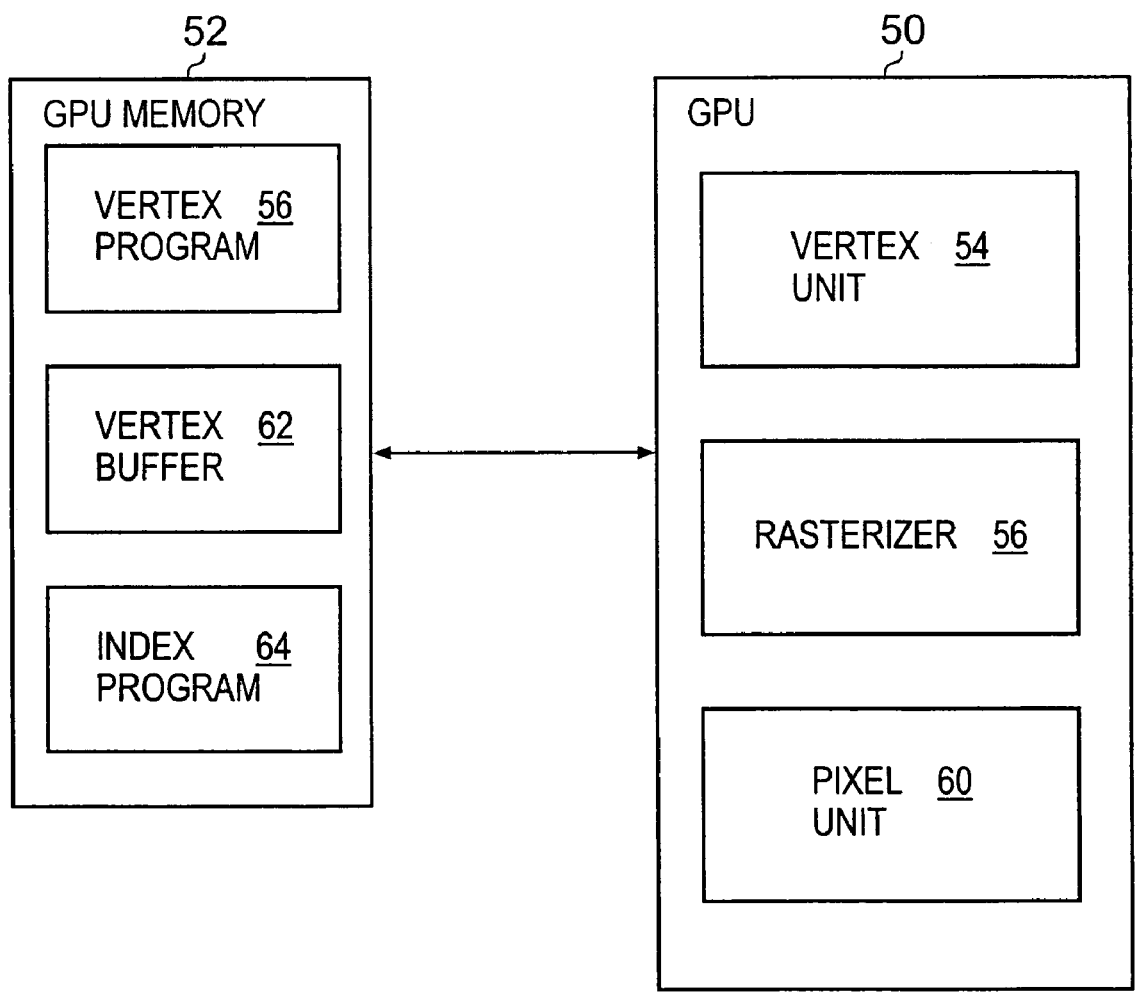
FIG. 3 schematically shows some of the features of the computer system of FIG. 2 is more detail.

One typical arrangement for a GPU 50 and GPU memory 52 is shown in FIG. 3. The GPU comprises a programmable vertex unit 54 which is operable to run a vertex program 56 held in the GPU memory 52; a rasterizer 58 which is operable to process triangles formed from groups of three output vertices output by the vertex unit one at a time; and pixel unit 60 which is operable to output information to a screen buffer (not illustrated) in the GPU memory. A typical GPU memory 52 comprises a vertex buffer 56, an index buffer 62 and the screen buffer 64. The vertex buffer 62 stores input vertices for the vertex program 56 to process and the vertex program can access these stored values. Vertex programming languages (e.g. a vertex assembly language) have standard commands to use the vertex buffer. As already discussed, the input vertices may be formatted in a Flexible Vertex Format.

To program the vertex unit of a GPU an appropriate vertex buffer, index buffer and vertex program are loaded into the GPU in what are known as "slots". An appropriate command is sent from the CPU to the GPU and the vertex program runs in accordance with its instructions. Values from the vertex buffer are read by the vertex program, processed in accordance with the vertex program (conventionally some kind of transformation process) and passed to the next units of the GPU (generally the rasterizer and pixel unit). The index buffer relates or indexes the vertexes stored in the vertex buffer by relating each vertex to a triangle. Whilst the vertex unit reads an input vertex and processes it to output a respective output vertex, the later units of the GPU support the notion of triangles and, as is known in the art, the index buffer can be used by these units to group vertices into triangles.

As already mentioned, the GPU, typically either as part of the rasterizer or as a separate component between the vertex unit and the rasterizer has the in-built ability to automatically reject (i.e. not process or draw) a degenerate triangle (i.e. a triangle with two corners in the same position).

For the purposes of understanding the present invention it is sufficient to note that the GPU has the in-built ability to automatically reject a degenerate triangle and to consider the GPU as having a vertex unit which is operable to process information in the GPU memory in accordance with a vertex program. The information in the GPU array and the vertex program will be described later in more detail.

First, a cubic volume will be briefly discussed with reference to FIGS. 4A and 4B; this is relevant for all aspects of the invention. The first and third aspects of the invention will then be described with reference to FIGS. 5A to 5D and 6 to 8. Following that, the second and fourth aspects will be discussed with reference to FIGS. 9A to 9D and 10 to 15.

Figure 4A:
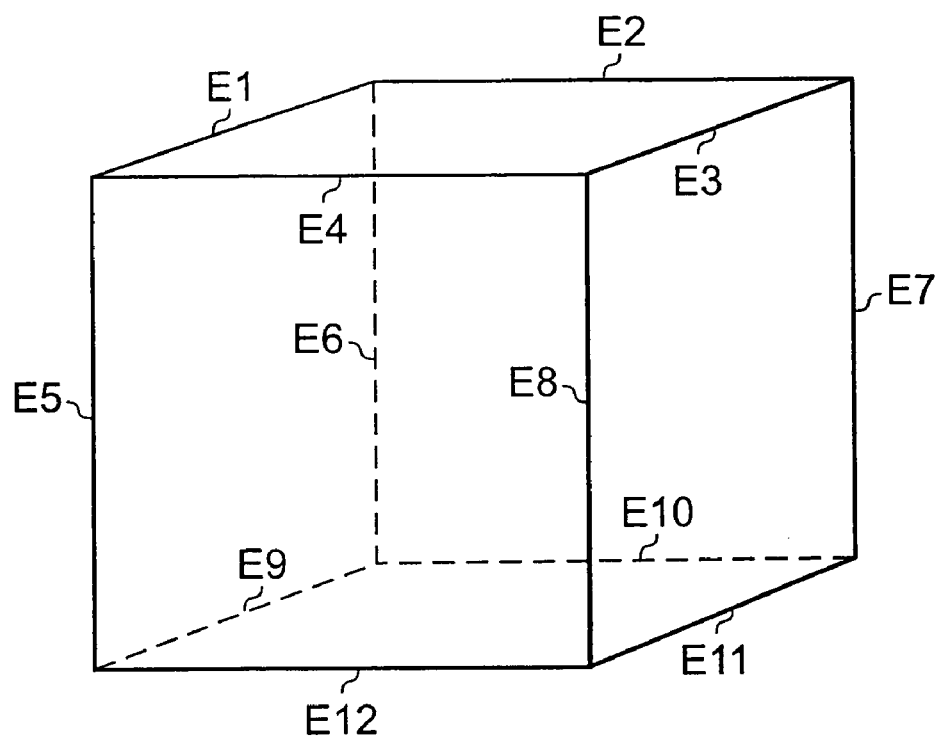
FIGS. 4A and 4B illustrate a cubic volume and labels its edges and corners.

Referring to FIG. 4A a cubic volume representing a cubic volume data set is illustrated. The twelve edges are labelled E1 to E12. FIG. 4B shows the same volume with the eight edges labelled C1 to C8.

Figure 5A:
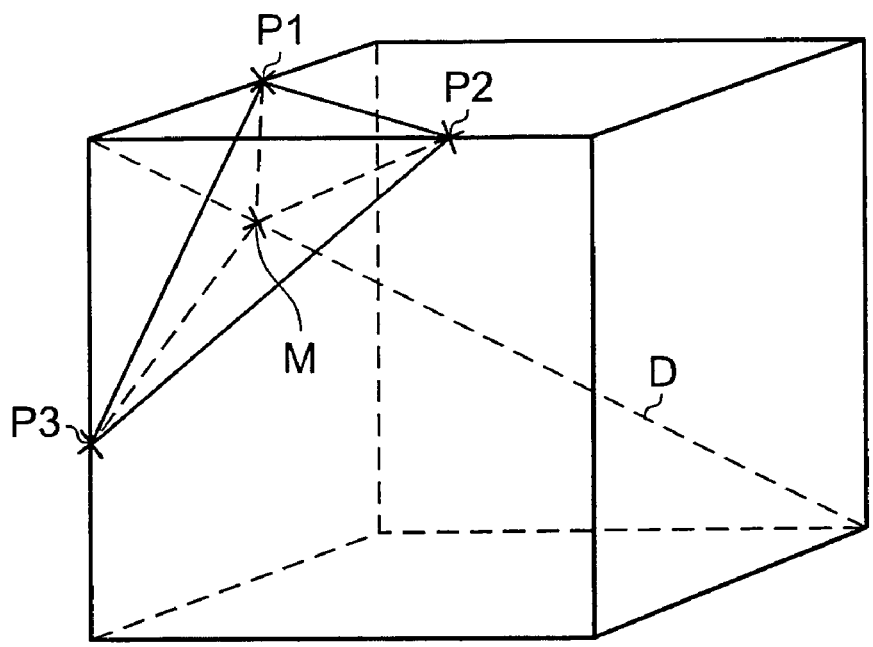
FIGS. 5A to 5D illustrate some polygon shapes formed by planes intersecting the cubic volume to assist in understanding the first and third aspects of the invention.

A plane can intersect a cubic volume so that it forms either a three-, four-, five- or six-sided polygon. Examples of these polygons are illustrated in FIGS. 5A to 5D. In FIG. 5A the plane intersects three edges, specifically edges E1, E4 and E5 defined by corners C1 and C2 (for E1), C1 and C4 (for E4) and C1 and C5 (for E5). The actual points of intersection in FIG. 5A are labelled as intersection points P1, P2 and P3 respectively. A Diagonal line D joins opposite corners of the cube, here corners C1 and C7. This line intersects the plane at inner intersection point M.

The three points P1, P2 and P3 and point M define three triangles: triangle P1-P2-M; triangle P1-P3-M; and triangle P2-P3-M. These three triangles are termed valid triangles for the particular plane illustrated because they are within the volume and on the particular plane. Each of these valid triangles can be represented directly, for example for the first triangle the triangle can be directly represented by the points P1-P2-M. One approach would be to use the CPU to calculate the three points of a triangle in object or volume space (as a direct representation) and to use the vertex unit to transform the three points into the two dimensional image plane.

For each triangle, but again using the example of P1-P2-M, an indirect representation of the triangle can be created as

{C1, C2, C1, C4, M}     (1)

{C1, C2, C1, C4, C1, C7}     (2)

For the indirect representation (1) each element is a coordinate defining a corner of the volume, the first pair of which (C1, C2) define the edge E1 and therefore indirectly represent point P1. The second pair of coordinates (C1, C4) define the edge E4 and therefore indirectly the point P2. The fifth coordinate is the position of the inner point M.

For indirect representation (2) the only difference is that rather than the position of point M being included, a further pair of coordinates (C1, C7) are included which define the diagonal line D.

Such indirect representations together with the plane equation define the exact coordinates of triangle P1-P2-M (in other words the indirect representation combined with the plane equation can give the direct representation).

Figure 5B:
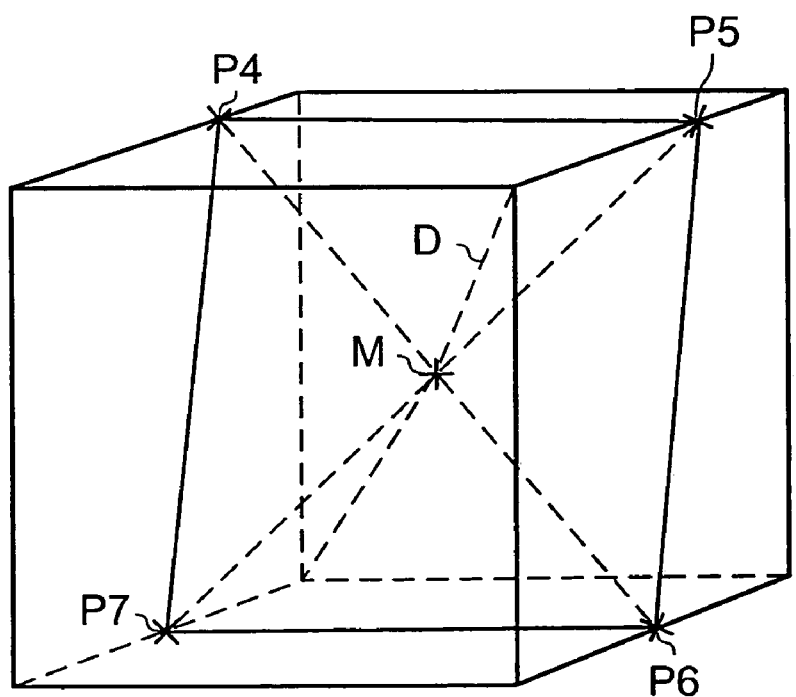
Figure 5C:
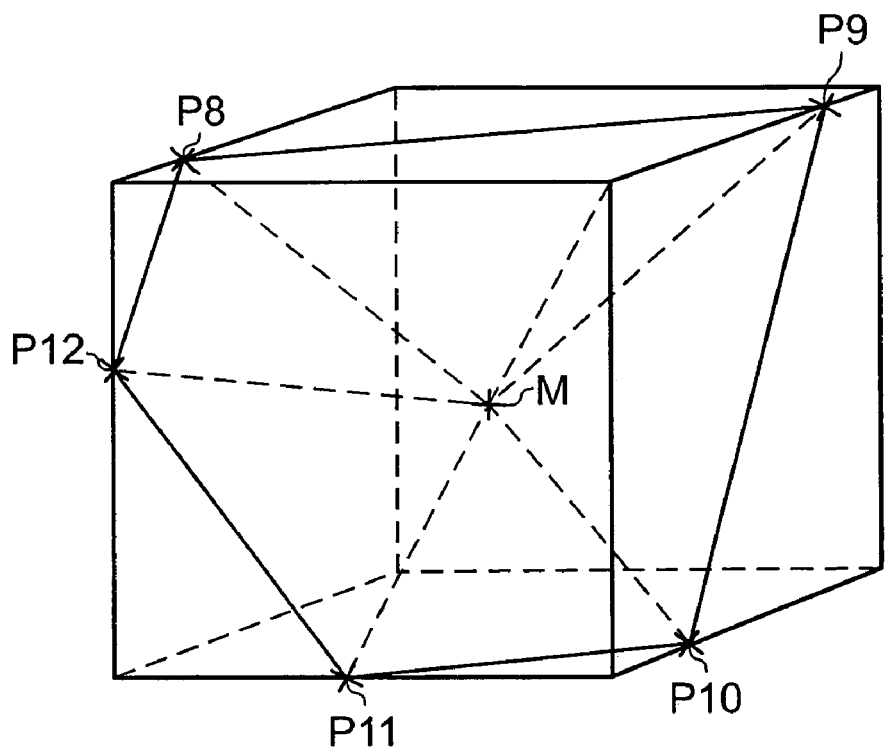
Figure 5D:
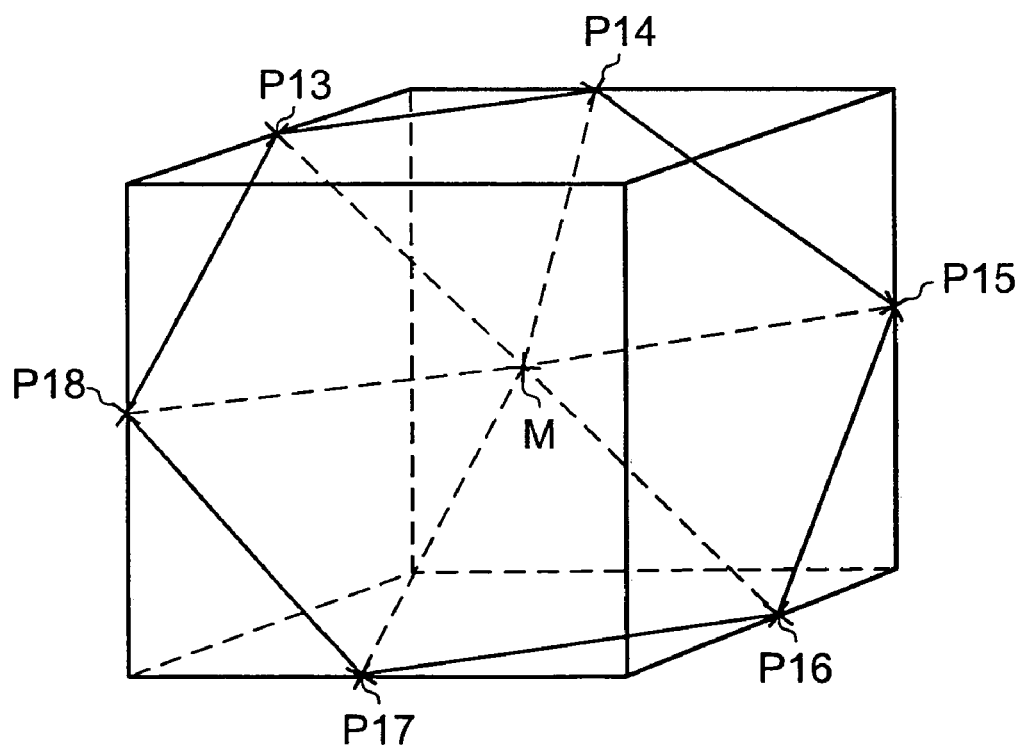

Referring briefly to FIGS. 5B to 5D, these figures show particular plane/volume interactions to produce four-, five- and six-sided polygons respectively. Again a diagonal line joining opposite corners and intersecting the plane at point M is shown.

Figure 4B:
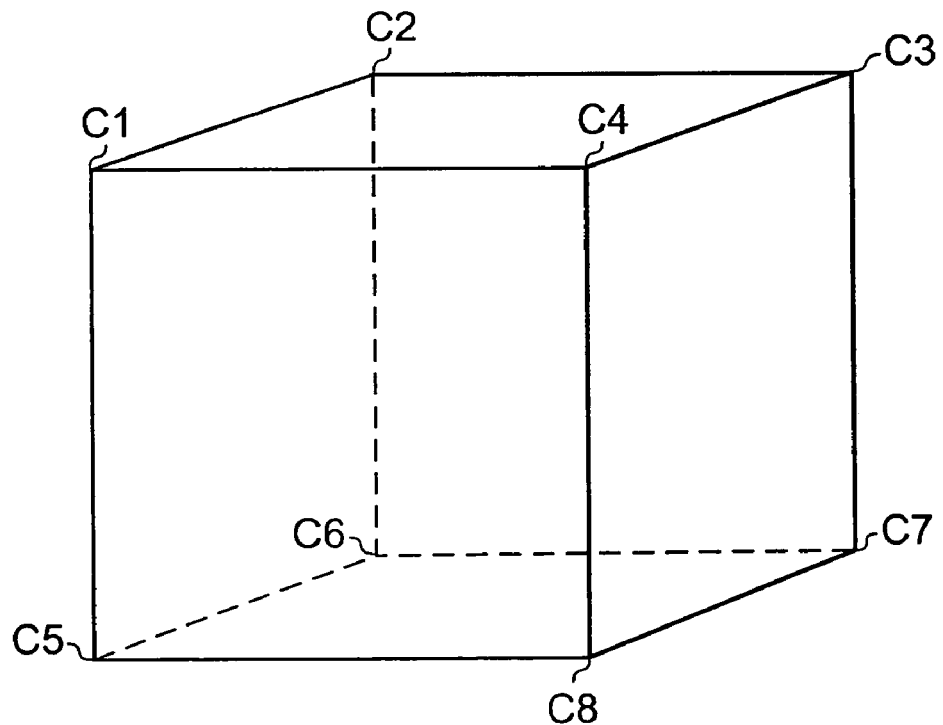

Using the same edge and corner numbering conventions as for FIGS. 4A and 4B, the indirect representation of the four triangles of the four-sided polygon of FIG. 5B (defined by points P4, P5, P6 and P7 on edges E1, E3, E11 and E9 respectively) in the form (2) are:
Triangle P4-P5-M: {C1, C2, C3, C4, C4, C6};
Triangle P5-P6-M: {C3, C4, C7, C8, C4, C6};
Triangle P6-P7-M: {C7, C8, C5, C6, C4, C6}; and
Triangle P4-P7-M: {C1, C2, C5, C6, C4, C6}.

Similarly with reference to the five-sided polygon of FIG. 5C the indirect representation of the five triangles (defined by points P8, P9, P10, P11 and P12 on edges E1, E3, E11, E12 and E5 respectively) in the form (2) are:
Triangle P8-P9-M: {C1, C2, C3, C4, C4, C6};
Triangle P9-P10-M: {C3, C4, C7, C8, C4, C6};
Triangle P10-P11-M: {C7, C8, C5, C8, C4, C6};
Triangle P11-P12-M: {C5, C8, C1, C5, C4, C6}; and
Triangle P8-P12-M: {C1, C2, C1, C5, C4, C6}.

Similarly with reference to the six-sided polygon of FIG. 5D the indirect representation of the six triangles of the (defined by points P13, P14, P15, P16, P17 and P18 on edges E1, E2, E7, E11, E12 and E5 respectively) in the form (2) are:
Triangle P13-P14-M: {C1, C2, C2, C3, C4, C6};
Triangle P14-P15-M: {C2, C3, C3, C7, C4, C6};
Triangle P15-P16-M: {C3, C7, C7, C8, C4, C6};
Triangle P16-P17-M: {C7, C8, C5, C8, C4, C6};
Triangle P17-P18-M: {C5, C8, C1, C5, C4, C6}; and
Triangle P13-P18-M: {C1, C2, C1, C5, C4, C6}.

All of the above indirect representations are of valid triangles since only valid triangles—triangles which are within the volume and on the particular illustrated plane—have been discussed. It will be noted that for each triangle the third pair of coordinates of three pairs is for the point M which can be defined as the intersection of the plane with a line between a specified corner (e.g. the furthest corner from the plane) and the corner opposite that corner. M does not differ from indirect representation to indirect representation, whereas the first two pairs of coordinates do differ. Looking at the first two pairs of coordinates for all of the indirect representations of valid triangles, these have the property that the pair of coordinates define a pair of edges on the same face.

Viewing the cube as a whole, there are six faces and for each face six possible combinations of pairs of edges on the face (e.g for the face defined by edges E1, E2, E3 and E4 the 6 pairs of edges are E1+E2, E2+E3, E3+E4, E1+E4, E1+E3 and E2+E4). Accordingly, for the six faces there are 36 (6 faces×6 combinations of edges) possible edge combinations.

Each of the 36 possible edge combinations correspond to an indirect representation of a candidate triangle, having a corner on the first edge, a corner on the second edge and a corner at point M. Therefore there are a set of 36 candidate triangles for the cube, of which, depending on the defined plane, between three and six will be valid and the other triangles will be invalid (for that plane). That is to say, for a given plane/volume interaction a subset of the candidate triangles are valid triangles which are within the volume and on the given plane and the remaining triangles are invalid triangles. Any of the candidate triangles may be valid—this depending on the given plane/volume interaction.

Each candidate triangle can be represented indirectly as two pairs of two coordinates, each pair of coordinates defining an edge. This, together with the point M, is an indirect representation of the triangle. For example the indirect representation of the first two of the six candidate triangles for the face E1, E2, E3, and E4 are:

Candidate triangle 1 (E1, E2): {C1, C2, C2, C3}
{M}

Candidate triangle 2 (E2, E3): {C2, C3, C3, C4}
{M}     (3)

and so on.

Triangle data is generated which comprises an indirect representation of each triangle of a set of the 36 candidate triangles. If a given plane intersects the volume, there will be between three and six valid triangles (see FIGS. 5A to 5D and the discussion above) and any of the candidate triangles may become a valid triangle, depending on the plane equation for the given plane. The remaining triangles are invalid triangles for the given plane. If the plane does not intersect the volume, all the triangles are invalid.

It will be appreciated that in this example the set of candidate triangles is the set of all topologically possible triangles (i.e. there are no pairs of edges omitted that could represent a triangle) and the triangle data comprises an indirect representation of each topologically possible triangle. It will also be appreciated that a different volume shape, for example a tetrahedron, would have a different set (and a different number) of candidate triangles.

Figure 6:
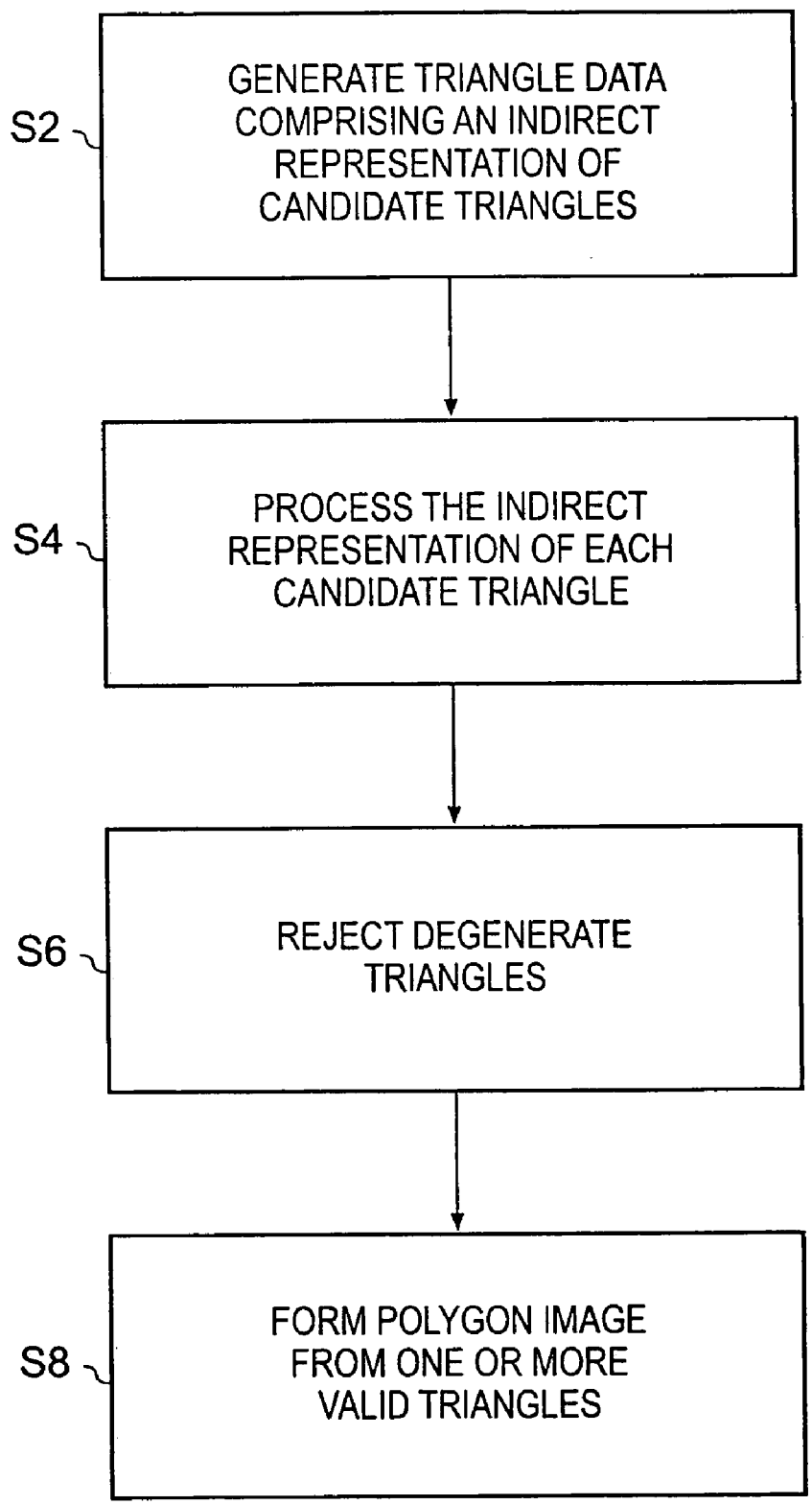
FIGS. 6 to 8 shows flow diagrams schematically representing methods of rendering a two dimensional polygon image from volume data defining a volume and plane data defining a two dimensional plane which intersects the volume in accordance with embodiments illustrating the first and third aspects of the invention.
Figure 7:
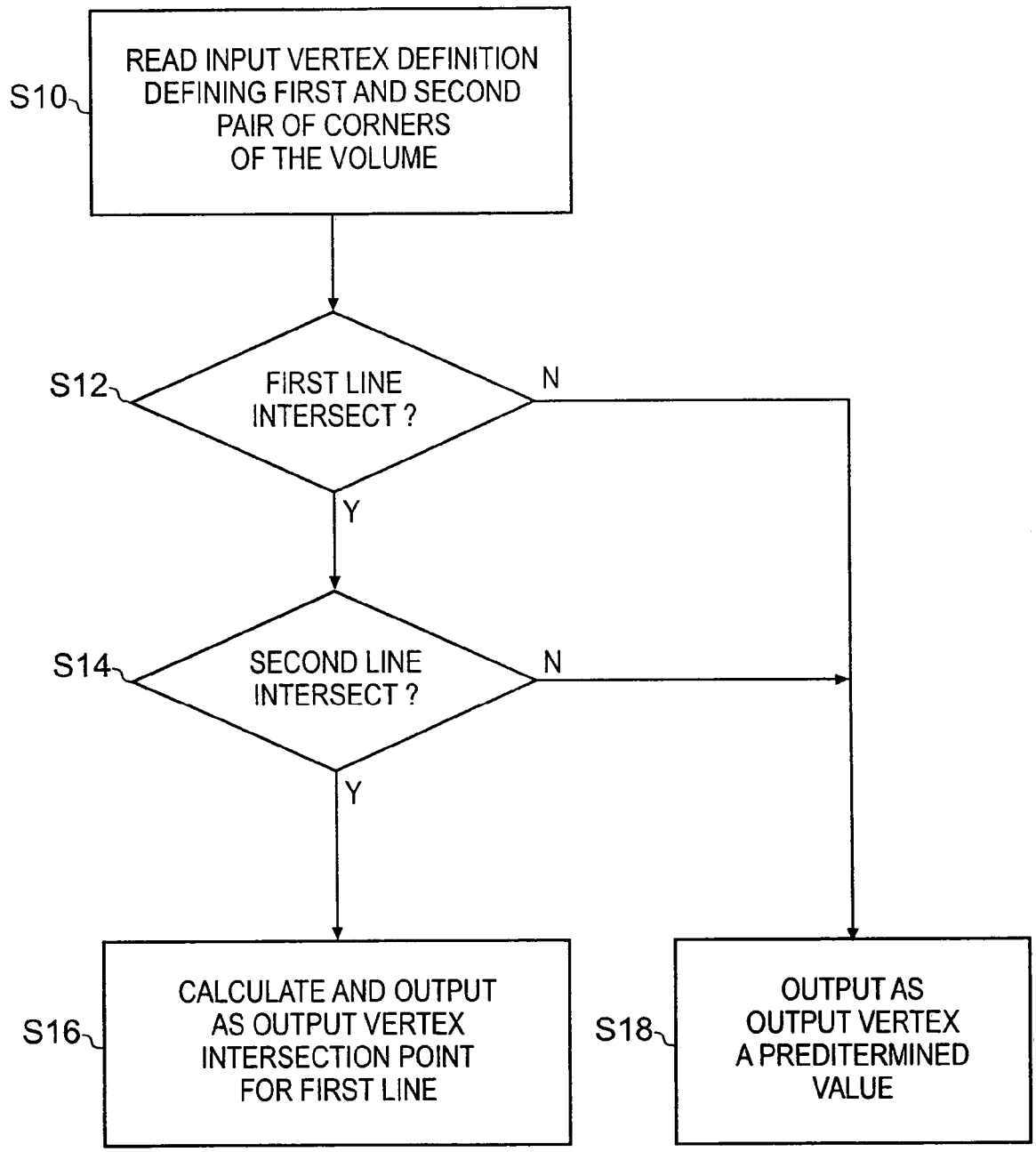
Figure 8:
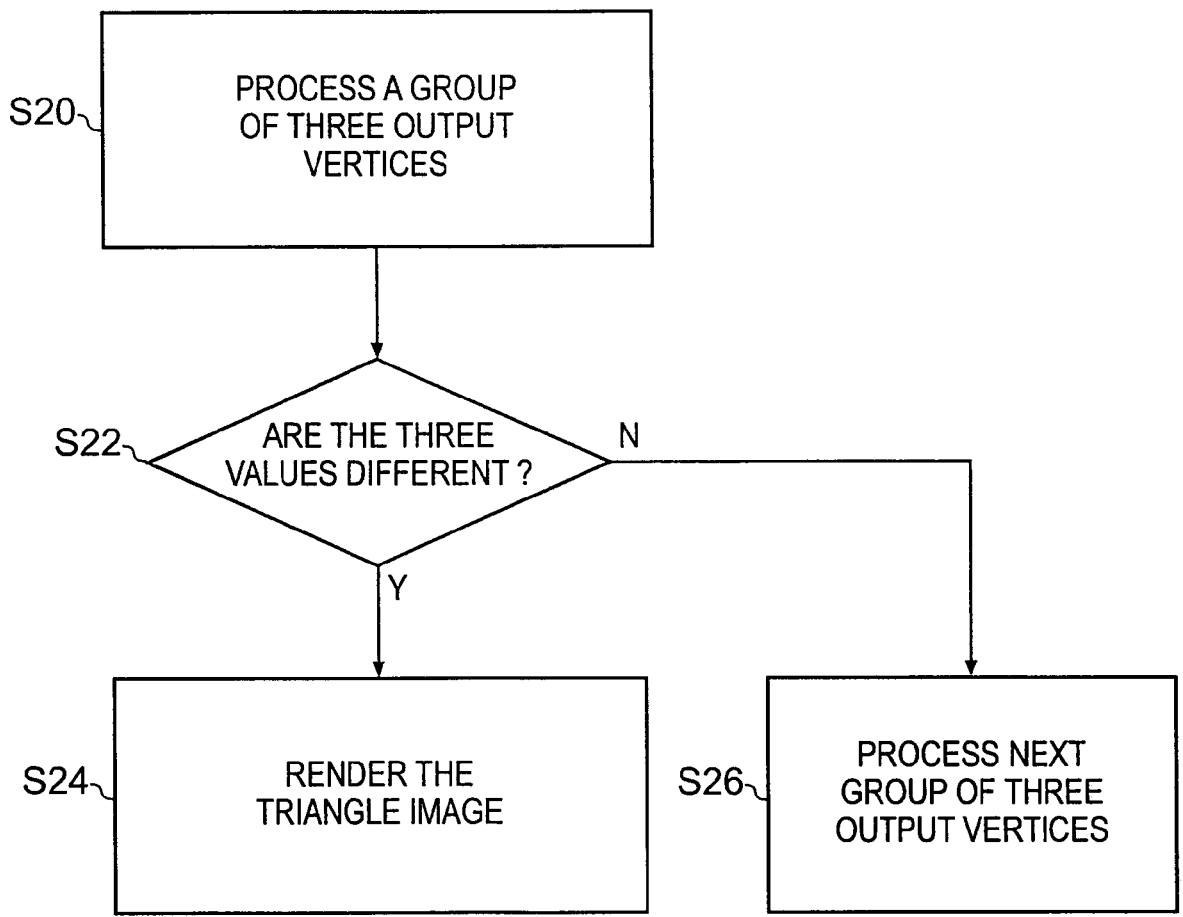

FIGS. 6 to 8 shows flow diagrams schematically representing methods of rendering a two dimensional polygon image from volume data defining a volume and plane data defining a two dimensional plane which intersects the volume in accordance with embodiments of the first and third aspects of the invention.

With reference to FIG. 6 at step S2 the apparatus generates triangle data comprising an indirect representation of each triangle of a set of candidate triangles. For a given plane/volume interaction a subset of the candidate triangles are valid triangles which are within the volume and on the given plane and the remaining triangles are invalid triangles.

In one embodiment, since there are 36 candidate triangles and three input vertex definitions per candidate triangle an array of 36×3×4×Float3 numbers is used (this corresponds to representation (2) above). In another embodiment an array of 36×2×4×Float3 numbers is used (this corresponds to representation (3) above) with a separate 4×Float3 number being stored representing point M by defining the pair of diagonal corners twice; in this embodiment the point M is only processed once and, as is known in the art, the rasterizer uses the index buffer to group together the output vertices to form the triangles.

In one embodiment, the CPU generates the triangle data and transfers it to the GPU memory and the array is loaded into the vertex buffer and index buffer, as appropriate, in the relevant slot.

In one embodiment, the CPU generates multiple identical instances of the triangle data which are to be used with different plane data. In another embodiment, the GPU generates multiple instances of the triangle data which differ by vertex coordinates and are to be used with different volume data.

In one embodiment the CPU also transfers a vertex program to the relevant slot in the GPU memory at this stage. The vertex program contains instructions to configure the vertex unit of the GPU.

In one embodiment the apparatus, typically using the CPU, also transfers the plane equation to the GPU memory at this stage, typically as a constant for the vertex program. For example, the plane equation can be expressed as a Float4 vector (in the form P={Nx, Ny, Nz, D}).

In one embodiment the apparatus, typically using the CPU, also transfers other relevant parameters to the GPU memory at this stage, for example parameters defining the location and size of the volume.

At step S4 the GPU processes the indirect representation of each triangle of the set of candidate triangles. As is known in the art, the apparatus (typically using the CPU) only needs to send a "run" command to the GPU to begin the process. For example, the "DrawPrimitive" or "DrawIndexPrimitive" commands using Direct X API.

At step S4 the GPU outputs for a valid triangle for the defined plane a direct representation of the valid triangle and for an invalid triangle for the defined plane a direct representation of a degenerate triangle. In one embodiment the output vertices for an invalid triangle comprise at least two identical values (i.e. a direct representation of a degenerate triangle having two corners in the same position).

At step S6 the GPU rejects each direct representation of a degenerate triangle from further processing. This is typically an in-built ability of the GPU and in one embodiment involves rejecting a group of three vertices comprising at least two identical values.

At step S8 the GPU processes each direct representation of a valid triangle to form one or more triangle images which form the two dimensional polygon image. Again, this is typically an in-built ability of the GPU.

As mentioned above, the conventional processing approach is to use a vertex unit to transform a single input vertex (i.e. a single coordinate or point) into a single output vertex (i.e. a single coordinate or point). However, in embodiments of the present invention rather than a single input vertex, an "input vertex definition" is used which defines, in one embodiment, the positions of a first and second pair of corners of the volume (and thereby the lines between the corners of each pair). Accordingly, in a departure from the conventional approach the vertex unit can be programmed to perform operations which involve the two lines.

In one embodiment the indirect representation of each triangle comprises a group of three input vertex definitions. Each input vertex definition defining a line on or through the volume. For a valid triangle for a given plane/volume interaction the line defined by each input vertex definition intersects the plane. In this embodiment the vertex unit is operable to process each input vertex definition of a valid triangle for the defined plane to output a respective output vertex by calculating and outputting the intersection point of the defined plane and the line defined by the input vertex definition.

In a particular embodiment each input vertex definition defines the positions of a first and second pair of corners of the volume. Each pair of corners defines a line on or through the volume. FIG. 7 illustrates the steps which the vertex unit is programmed (using a vertex program) to perform in this embodiment. It will be appreciated that the steps of FIG. 7 provide further detail of the processing of step S4 of FIG. S4 for a particular embodiment.

With reference to FIG. 7, at step S10 the vertex unit reads the input vertex definition which defines the positions of a first pair and a second pair of corners of the volume.

At step S12, the vertex unit checks if the line between the first pair of corners intersects the plane. This can be performed by calculating the dot product of each corner and the plane (specifically, in one embodiment a 4-element vector dot product in homogeneous coordinates). If one value is positive and the other value is negative then the line cuts the plane. If both values are positive, or if both are negative, then the line does not cut the plane.

If the line cuts the plane processing proceeds to step S14. If it does not then processing proceeds to step S118.

At step S14, the vertex unit checks if the line between the second pair of corners intersects the plane. If it does processing proceeds to step S16. If it does not then processing proceeds to step S18.

At step S16 (in the case where both lines intersect the plane) then the intersection point for the first pair of corners and the plane is calculated and outputted as the output vertex. This calculation can be performed by the equation:

$$P1 = C1 + (\text{Fabs}(\text{dot}(C1, P))/(\text{Fabs}(\text{dot}(C1, P)) + \text{Fabs}(\text{dot}(C2, P))))*(C2-C1)$$

where P1 is the intersection point, C1 and C2 are the corners of the volume, Fabs represents taking the absolute value, dot represents taking the dot product, and P is the plane equation.

At step S20 (in the case that at least one of the lines does not intersect the plane) then a predetermined value (e.g. zero) is outputted as the output vertex. The same predetermined value is used for each iteration of the program.

In one embodiment the input vertex definition is in a flexible vertex format. In this embodiment, a flexible vertex format is used which for each input vertex definition uses a 4×Float3 representation comprising four vectors of three floating-point numbers which define the positions of the first and second pairs of corners to the volume. The vertex program is operable to process this 4×Float3 representation as a single vertex, referred to here as an input vertex definition, to output a respective output vertex which is a single vertex value or point.

In one embodiment, since there are 36 candidate triangles and three input vertex definitions per candidate triangle an array of 36×3×4×Float3 numbers is used (this corresponds to representation (2) above). In another embodiment an array of 36×2×4×Float3 numbers is used (this corresponds to representation (3) above) with a separate 4×Float3 number being stored representing point M by defining the pair of diagonal corners twice; in this embodiment the point M is only processed once and, as is known in the art, the rasterizer uses the index buffer to group together the output vertices to form the triangles.

The vertex unit performs the programmed operation of FIG. 7 for each input vertex definition in the GPU memory to output a respective output vertex. That is to say, the vertex unit is operable to perform the steps of FIG. 7 for each input vertex definition of each candidate triangle. Of the 36 candidate triangles, only between 3 and 6 are valid for the plane defined by the plane equation (provided the plane intersects the volume).

FIG. 8 illustrates the steps performed by the GPU (typically the rasterizer and typically a built in function) once the vertex program has calculated the group of three output vertices. At step S20 the group of three vertices are read. At step S22 whether the three values are different is determined. If the values are different then the candidate triangle is a valid triangle (for the defined plane) and accordingly at step S24 the GPU renders the triangle image. If the three values are not different then the candidate triangle is an invalid triangle (for the defined plane) and accordingly the GPU automatically rejects such a degenerate triangle. At step 26 the next candidate triangle is processed.

In a particular embodiment the vertex unit is operable to perform three iterations of the operations illustrated in FIG. 7 to output a group of three output vertices, one iteration for each of the group of three input vertex definitions. In an example of such an embodiment, a first input vertex definition defines the positions of a first pair of corners defining a line along a first edge of a face of the volume and the positions of a second pair of corners defining a line along a second edge of the face of the volume; a second input vertex definition defines the positions of a first pair of corners defining the line along the second edge and the positions of a second pair of corners defining the line along the first edge; and a third input vertex definition defines the positions of a first pair of corners defining a line between opposite corners of the volume and the positions of a second pair of corners defining the same line.

In this example the three different values for the group of three output vertices for a valid triangle comprise (a) the intersection point of the first edge with the plane, (b) the intersection point of the second edge with the plane, and (c) the inner intersection point. The three output vertices for an invalid triangle will contain the predetermined value for both (a) the intersection point of the first edge with the plane, (b) the intersection point of the second edge with the plane.

By following the processes of FIGS. 6, 7 and 8, it will be appreciated that the GPU rejects all the invalid candidate triangles and renders only images for the valid triangles. In certain embodiments the volume data can be notionally divided into a plurality of sub-volume data sets and each sub-volume data set rendered separately.

Embodiments in accordance with the first and third aspects of the invention heavily rely upon the vertex unit in that the vertex unit performs a calculation for each of the 36 candidate triangles. This has the advantage of having a low processing requirement of the CPU and also does not require traffic on the bus connecting the CPU and GPU or synchronization, which are each bottlenecks. However, in certain applications this may place an excessive load on the vertex unit and embodiments in accordance with the second and fourth aspects of the invention will be described which place a lower burden on the vertex unit.

Embodiments in accordance with the second fourth aspects of the invention can perform well when the volume of interest includes a large number of blocks; and also can avoid processing invalid triangles through the vertex unit. Also, these embodiments can avoid communication between the CPU and GPU except for passing the vertex program constants Embodiments in accordance with the second and fourth aspects of the invention will be described with reference to FIGS. 9A to 9D and 10 to 15.

Figure 9A:
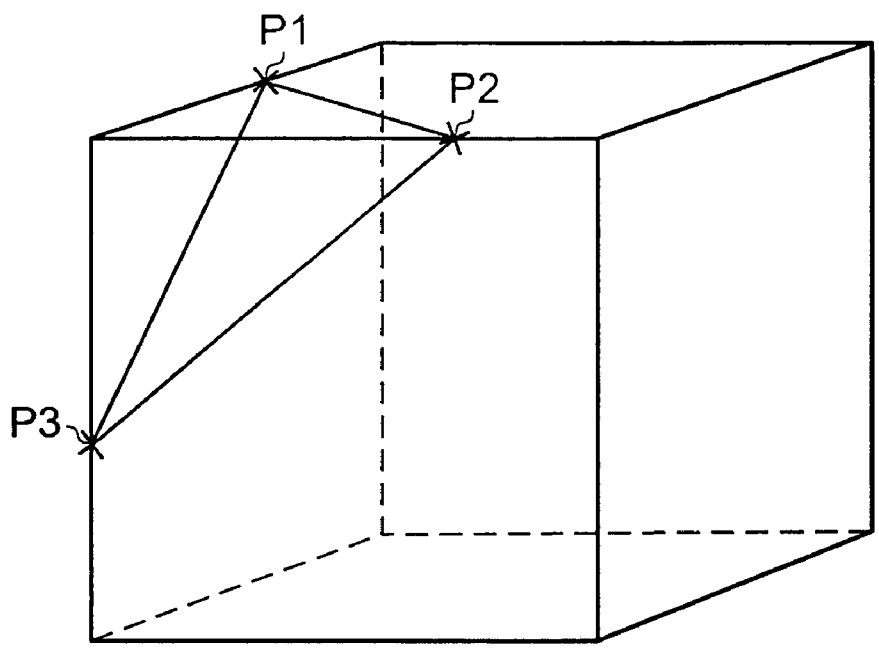
FIGS. 9A to 9D illustrates some polygon shapes formed by planes intersecting a cubic volume to assist in understanding the second and fourth aspects of the invention.

FIGS. 9A to 9D conform generally to FIGS. 5A to 5D except the polygons illustrated are divided into triangles in a different way for the illustrated plane/volume interactions. Referring to FIG. 9A, the polygon is formed from one triangle, the triangle P1-P2-P3, each point cutting edges E1, E4 and E5 respectively.

Figure 9B:
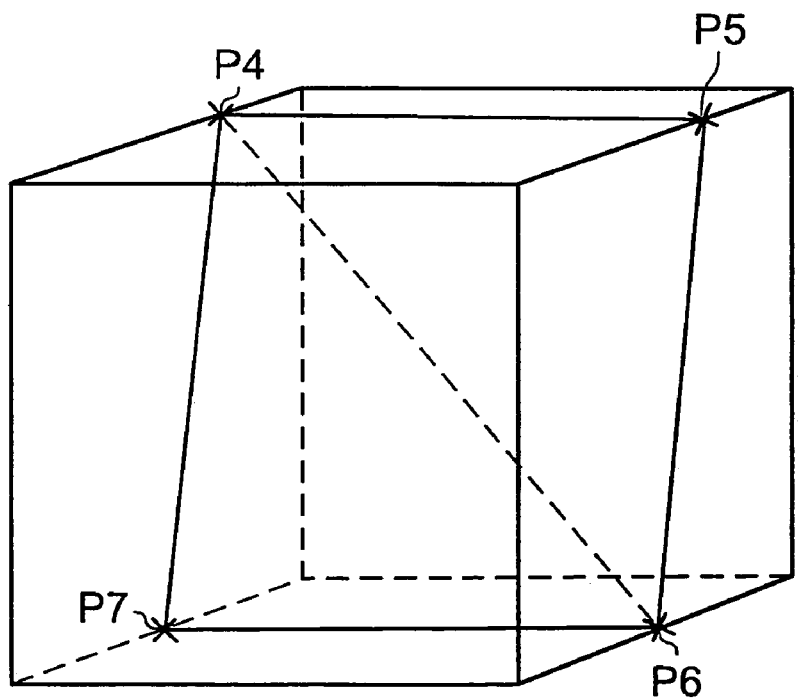
Figure 9C:
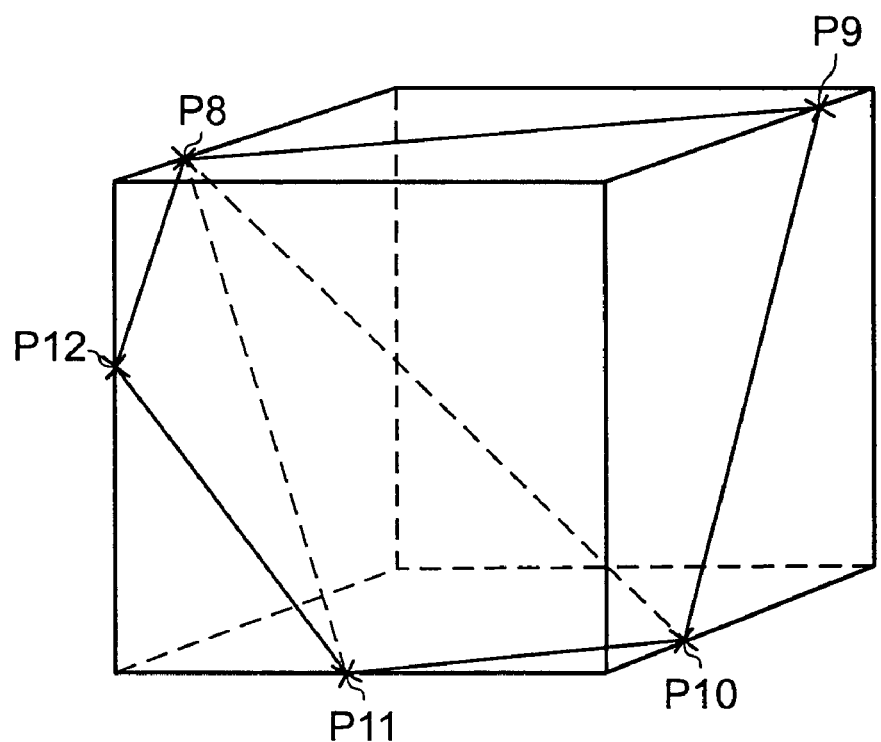
Figure 9D:
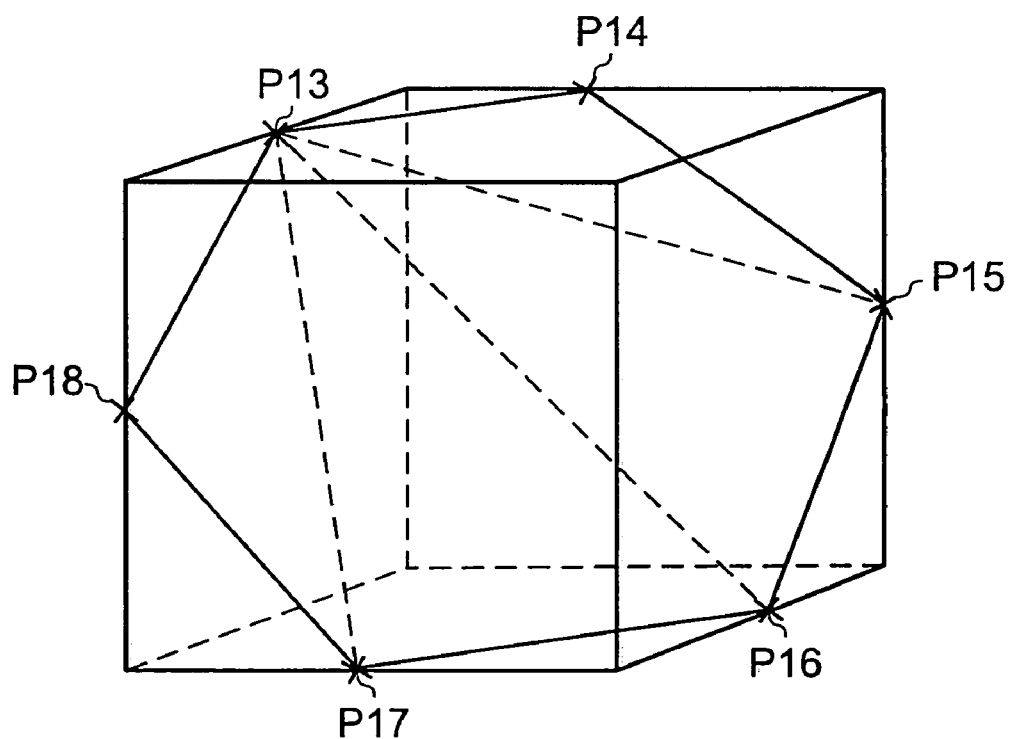

In FIG. 9B the four-sided polygon is formed from triangles P4-P5-P6 (cutting edges E1, E3 and E11) and P4-P6-P7 (cutting edges E1, E11 and E9). In FIG. 9C, the five-sided polygon is formed from triangles P8-P9-P10; P8-P10-P11; P8-P11-P12 as illustrated. In FIG. 9D, the six-sided polygon is formed from triangles P13-P14-P15; P13-P15-P16; P13-P16-P17; and P13-P17-P18 as illustrated.

Each of the representations of triangles above (e.g. P1-P2-P3) is a direct representation. A corresponding indirect representation of each triangle can be constructed (e.g. {C1, C2, C1, C4, C1, C5} with each corner of the triangle (e.g. P1) being indirectly represented by a pair of corners of the volume (e.g. {C1, C2}). The indirect triangle representations can be combined to form an indirect representation of the polygon, for example, with reference to FIG. 9B, the indirect representations of triangles P4-P5-P6 and P4-P6-P7 can be combined to form an indirect representation of the four-sided polygon.

When a particular plane intersects the volume each corner of the volume falls on one side of the plane or the other side. For example, in FIG. 9A one corner (C1) is one side of the plane and the other seven corners are on the other side.

Figure 10:
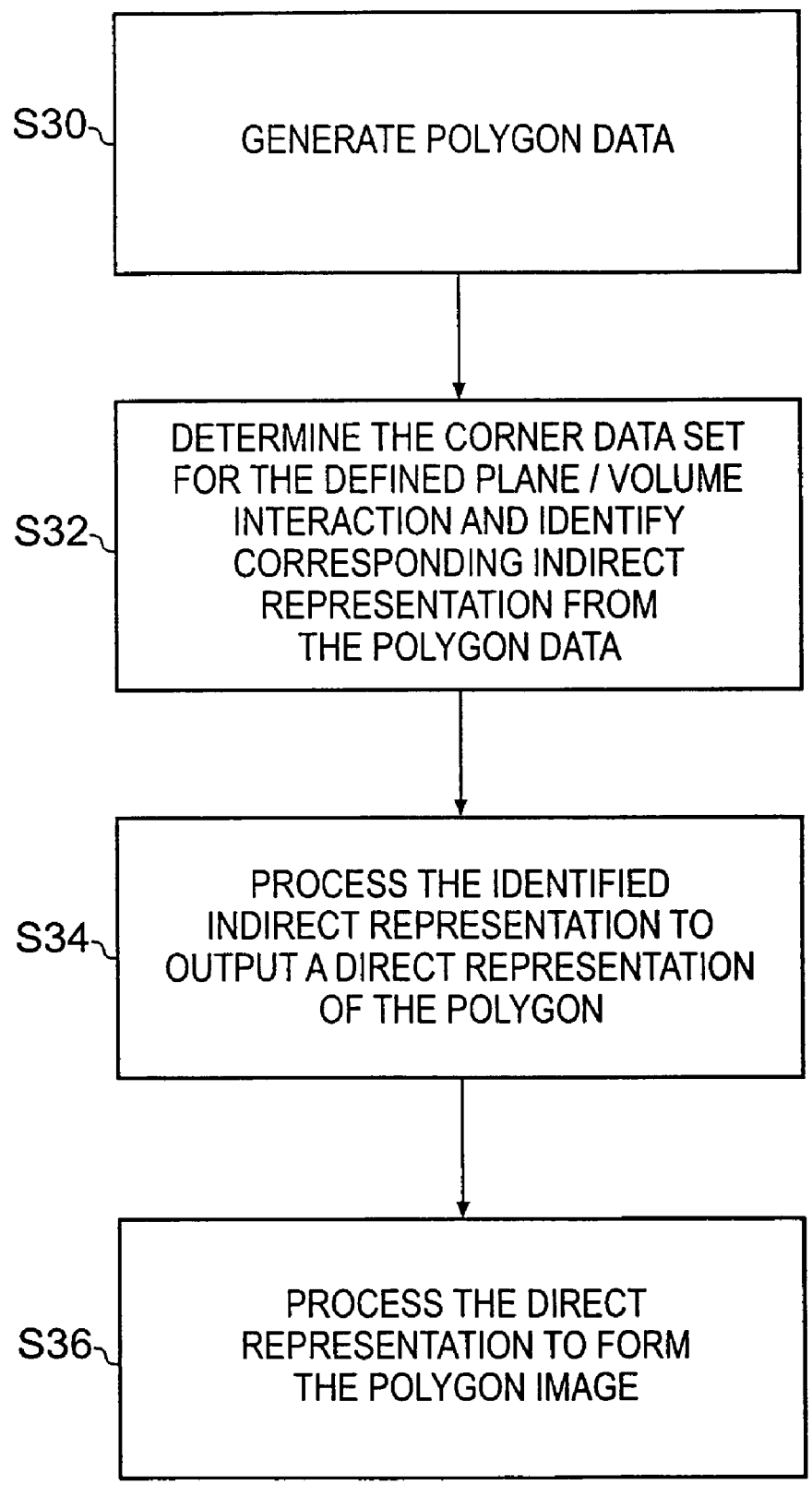
FIGS. 10 and 11 show flow diagrams schematically representing methods of rendering a two dimensional polygon image from volume data defining a volume and plane data defining a two dimensional plane which intersects the volume in accordance with embodiments illustrating the second and fourth aspects of the invention.

Referring to FIG. 10, the operations performed in one embodiment of an apparatus for rendering a two dimensional polygon image from volume data defining a volume and plane data defining a two dimensional plane intersecting the volume are illustrated.

At step S30, polygon data is generated comprising for each topologically possible plane/volume interaction (i) a corner data set indicating for each corner of the volume whether the corner is one side or the other side of the plane and (ii) an indirect representation of the polygon formed by the plane/volume interaction.

In one embodiment the indirect representation of each polygon comprises an indirect representation of one or more triangles which form the polygon and the GPU is operable to perform operations (c) and (d) by processing the indirect representation of each triangle of the identified indirect representation of a polygon.

In one embodiment the polygon data is generated by the CPU.

In one embodiment, the CPU generates multiple identical instances of the polygon data which are intended to be used with different plane data. In another embodiment, the CPU generates multiple instances of the polygon data which differ by vertex values and which are intended to be used with different volume data.

In one embodiment the CPU transfers the polygon data to the GPU memory at this stage and the array is loaded into the vertex buffer and index buffer, as appropriate, in the relevant slot.

In one embodiment the CPU also transfers a vertex program to the relevant slot in GPU memory at this stage. The vertex program contains instructions to configure the vertex unit of the GPU.

In one embodiment the apparatus, typically using the CPU, also transfers the plane equation to the GPU memory at this stage, typically as a constant for the vertex program. For example, the plane equation can be expressed as a Float4 vector (in the form P={Nx, Ny, Nz, D}).

In one embodiment the apparatus, typically using the CPU, also transfers other relevant parameters to the GPU memory at this stage, for example parameters defining the location and size of the volume.

At step S32, the corner data set is determined for the defined plane/volume interaction and is used as a key to identify the corresponding indirect representation of a polygon from the polygon data. This is described in more detail later.

At step S34, the GPU processes the identified indirect representation of a polygon to output a direct representation of the polygon. As is known in the art, the apparatus (typically using the CPU) only needs to send a "run" command to the GPU to begin the process. For example the "DrawPrimitive" command using Direct X API.

At step S36, GPU processes the direct representation of the polygon to form the two dimensional polygon image. This is typically an in-built ability of the GPU.

As already mentioned, the conventional processing approach is to use a vertex unit to transform a single input vertex (i.e. a single coordinate or point) into a single output vertex (i.e. a single coordinate or point). However, in embodiments of the present invention rather than a single input vertex, an "input vertex definition" is used which defines, in one embodiment, the positions of a pair of corners of the volume which define a line along an edge of the volume. Accordingly, in a departure from the conventional approach the vertex unit can be programmed to perform operations which involve this line.

In one embodiment, in which the indirect representation of each polygon comprises an indirect representation of one or more triangles, the indirect representation of each triangle comprises a group of three input vertex definitions.

Figure 11:
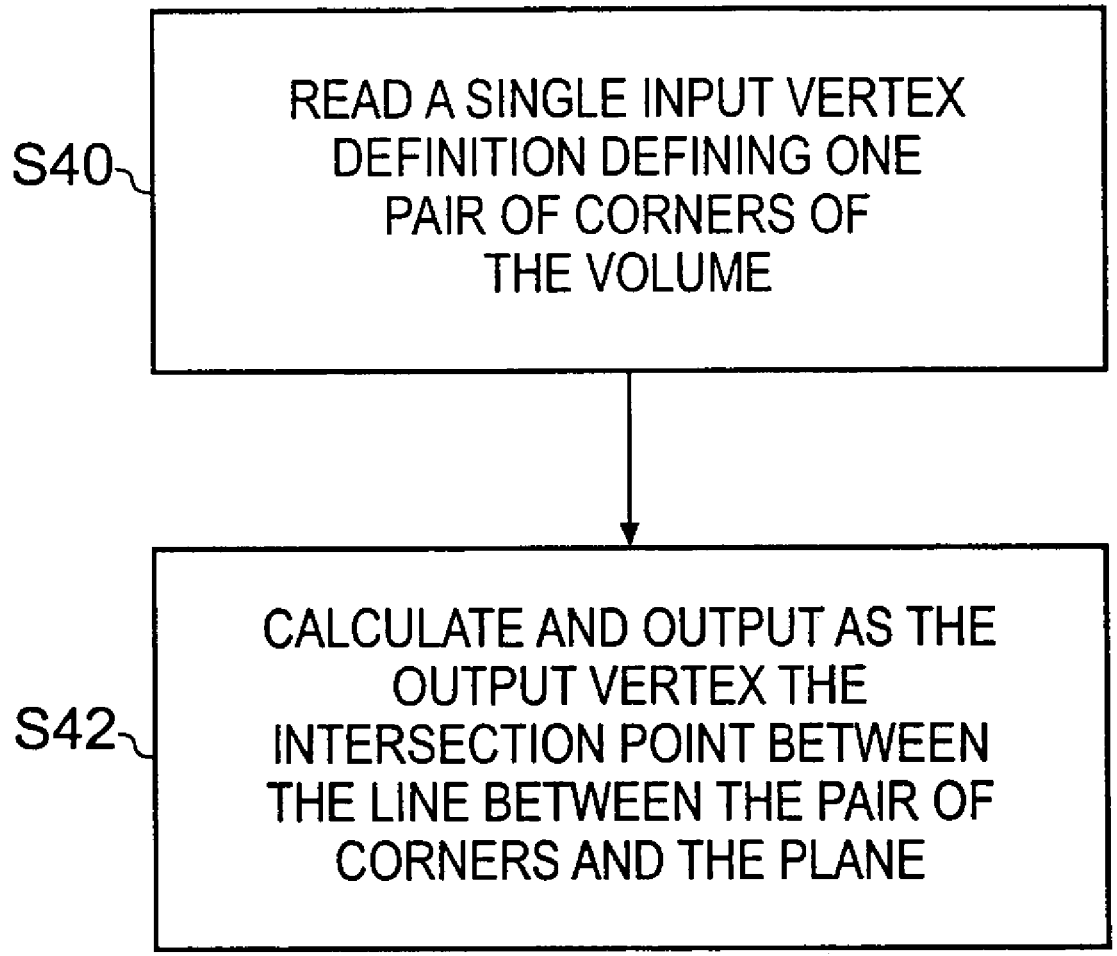

In a particular embodiment, each input vertex definition defines the position of a pair of corners of the volume which defines a line along an edge of the volume. FIG. 11 illustrates the steps which the vertex unit is programmed (using a vertex program) to perform in this embodiment. It will be appreciated that the steps of FIG. 11 provide further detail of the processing of step S34 of FIG. 10 for a particular embodiment.

At step S40, the vertex unit reads the input vertex definition which defines the positions of a pair of corners of the volume which define a line along the edge of the volume. This line intersects the plane (since the corner data set for the defined plane/volume interaction has been used as a key to identify the indirect representation being processed).

At step S42 the vertex unit calculates and outputs the intersection point of the defined plane and the line defined by the input vertex definition. This value is the output vertex. The calculation can be performed by the same equation as for step S16 of FIG. 7.

In one embodiment the input vertex definition is in a flexible vertex format. In this embodiment a flexible vertex format is used which for each input vertex definition uses a 2×Float3 representation comprising two vectors of three floating-point numbers which define the positions of two corners of volume. The vertex program is operable to process this 2×Float3 representation as a single input vertex definition, to output a respective output vertex which is a single vertex value or point.

The number of 2×Float3 numbers processed will depend on the number of triangles forming the polygon and on the extent to which indexing is used.

In certain embodiments the volume data can be notionally divided into a plurality of sub-volume data sets and each sub-volume data set rendered separately.

In one embodiment, the polygon data is generated for each topologically possible plane/volume interaction by: (a) generating a set of all possible corner data sets comprising a mathematical representation of each mathematically possible combination of corners of the volume being one side or the other side of the plane, and (b) processing the set of all possible corner data sets to determine which of the corner data sets represent topologically possible plane/volume interactions and which of the corner data sets represent topologically impossible plane/volume interactions.

In one embodiment the corner data set is an array of elements, each element representing a corner and storing either an indicator that the corner is one side of the plane or an indicator that the corner is the other side of the plane.

Figures 12, 13:
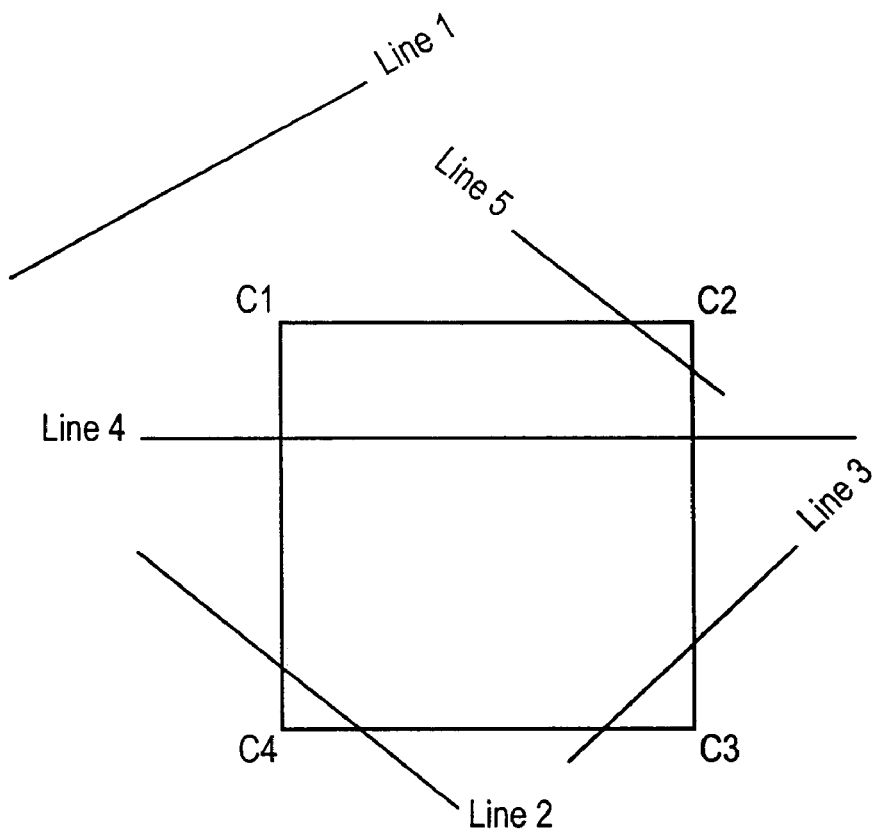
FIG. 12 illustrates in two dimensions lines intersecting a square to assist in understanding the second and fourth aspects of the invention.
FIG. 13 illustrates corner data sets representing whether each of the four corners lies one side or the other side of the plane and whether the corner data set is topologically valid.

The construction of the corner data set can be appreciated by considering FIGS. 12 and 13. FIGS. 12 and 13 represent a two dimensional view. A square (which can be considered as one face of a volume) is represented with corners C1 to C4. FIG. 13 illustrates six corner data sets. For each of corners C1 to C4 a 1 represents the corner being one side of a particular line and a zero represents the corner being on the other side of the line. First, a complete a set of all possible corner data sets comprising a mathematical representation of each mathematically possible combination of corners is generated (i.e. here the binary numbers from 0000 to 1111 inclusive, of which the first six only are illustrated).

The set of all possible corner data sets is processed to determine which of the corner data sets represent topologically possible combinations and which represent topologically impossible combinations. For example 0000 represents a valid line—e.g. line 1 of FIG. 12, although this of course is a trivial case. 0001 represents a topologically valid lines, as do 0010, 0011, and 0100—see lines 2, 3, 4 and 5 of FIG. 12. However, the combination 0101 is topologically impossible—no line can be drawn with C2 and C4 one side and C1 and C3 the other side of the line. Corresponding entries are made in the table of FIG. 13.

Figure 14:
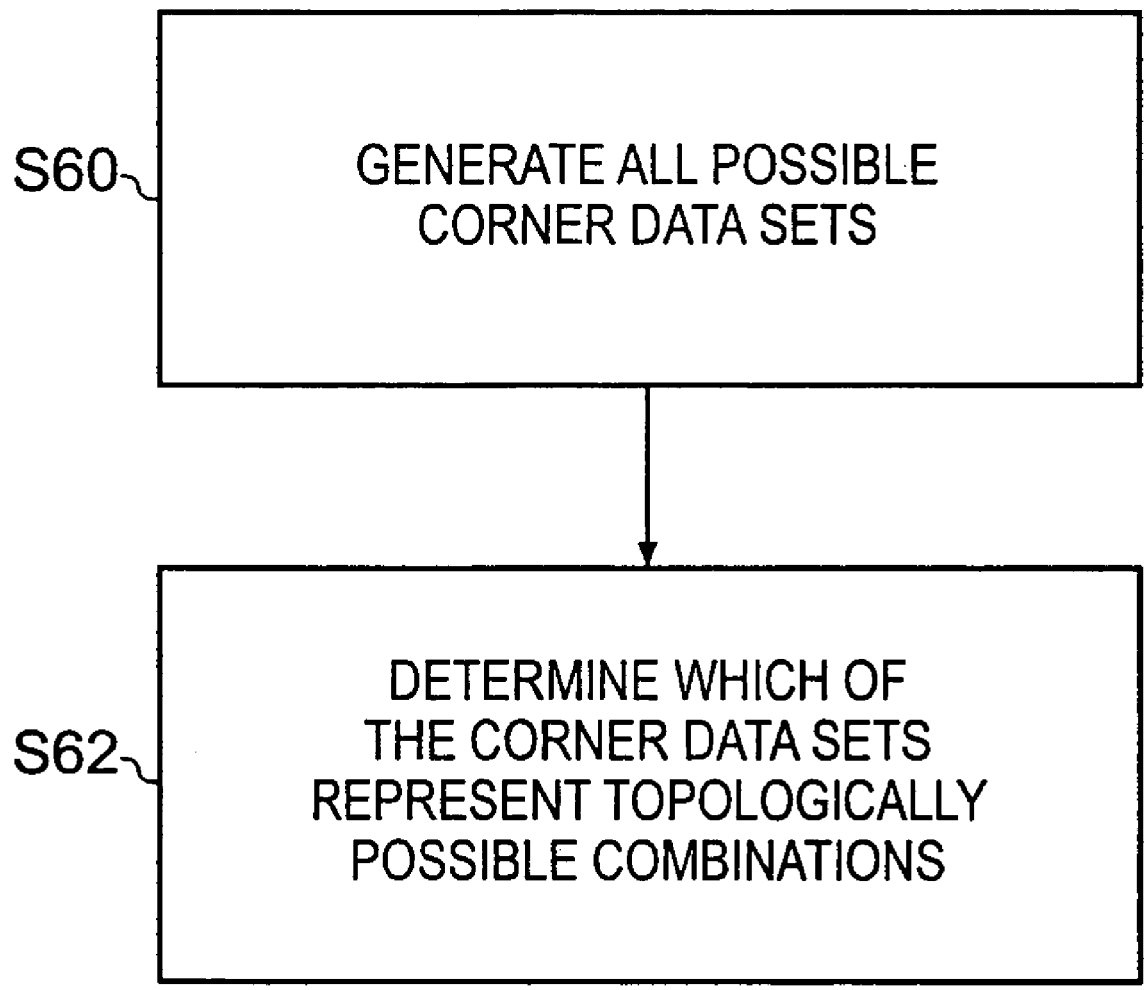
FIGS. 14 and 15 show flow diagrams schematically representing an example method for determining which corner data sets represent topologically possible combinations for a three dimensional volume.

With reference to FIG. 14, the method of constructing the set of valid corner data sets is illustrated. At step S60 all possible corner data sets are generated and at step S62 it is determined which of the corner data sets represent topologically possible combinations. How to perform these steps in two dimensions has been illustrated with reference to FIGS. 13 and 14. How to perform these steps for the three dimensional case will now be described.

First the set of all possible corner data sets is generated. Since there are eight corners and each corner can be one side or the other side of the plane there are $2^8$ possible combinations and these can be represented as the binary values 00000000 to 11111111 (i.e. 0 to 255).

Figure 15:
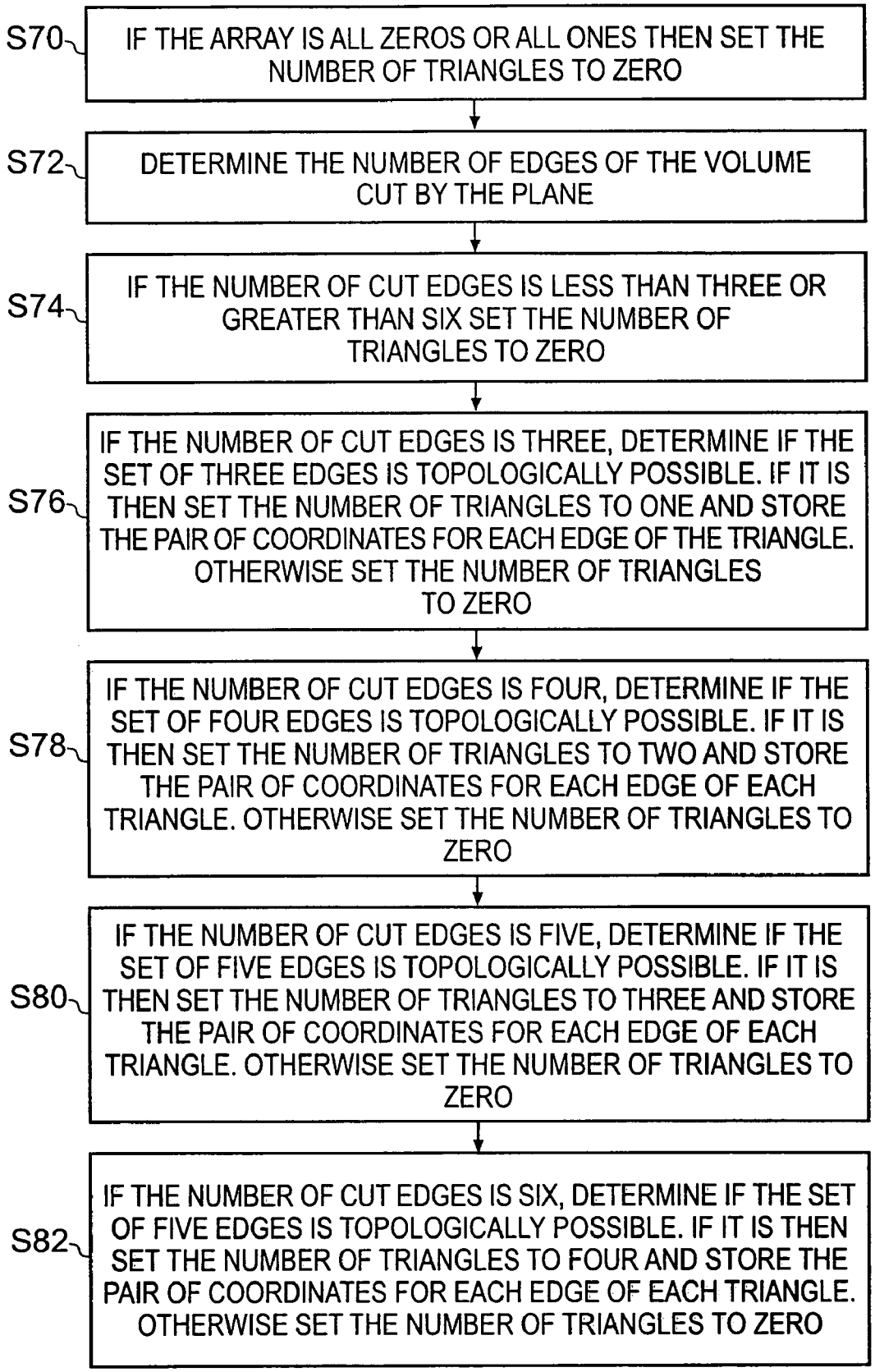

For each of these values 0 to 255, whether or not the corner data set is a topologically possible combination can be calculated in a number of ways. FIG. 15 illustrates one way of determining this. In the method of FIG. 15, the number of triangles which form the polygon is calculated; and an indirect representation of each triangle is stored. For a topologically invalid combination the number of triangles is set to zero.

In the illustrated method a set of data defining which corners relate to which edge of the volume is used.

Referring to FIG. 15, the steps illustrated are performed for each value from 0 to 255. At step S70 if the array is all zeros or all ones then the number of triangles is set to zero (this handles the two trivial cases).

At step S72 the set of data which defines which corners relate to which edge is used in combination with the value being processed (between 1 and 254) to determine how many edges are cut by the plane of the plane/volume interaction potentially represented by the value. If an edge has a zero and a one for its two corners then it is cut by the plane.

For a plane intersecting a volume the number of edges cut is between three and six times inclusive (see for example FIGS. 9A to 9D). At step S74 if the number of cut edges is less than three or greater than six the number of triangles is set to zero (i.e. the corner data set is invalid).

Steps S76, S78, S80 and S82 process the cases where the number of cut edges is three, four, five and six respectively. At step S76, if the number of cut edges is three, whether the set of edges is topologically possible is determined. Referring to FIG. 10A for a valid set of three edges the three cut edges must share a corner, for example corner C1 (see FIG. 4B and FIG. 9A). Accordingly the three cut edges are checked to see if they share a common corner. If so, the number of triangles is set to one and the coordinates of the corners of each pair of cut edges are stored (as an indirect representation of the triangle). If the three cut edges do not share a common corner a zero is stored as the number of triangles (i.e. the corner data set is invalid)

At step S78 a very similar process to step S76 is performed but for the case where four edges are cut by the plane. Referring to FIG. 9B, for a valid set of four edges these must be two edges on opposite sides of one face and two edges on corresponding opposite sides of the opposing face as shown in the Figure or the set of four edges may be two adjacent edges on one face and a corresponding pair on the opposing face. Again, the number of triangles (two) is stored and the coordinates of the corners of each pair of cut edges for each triangle are stored as the indirect representation of the triangles.

Similar steps are performed at steps S80 and S82. Valid combinations of edges for the five and six cut edges cases can be seen from FIGS. 9C and 9D.

Having performed the steps of FIG. 15 for each value from 00000000 to 11111111 and stored the data, the polygon data has been generated. For each value which has a non-zero number for the number of triangles then this is a valid polygon. The indirect representation of the valid polygon is stored as the indirect representation of each of the triangles.

Now, for a particular plane, referring back to FIG. 10 and step S32 the plane equation can be used to determine whether each corner is one side or the other side of the plane (i.e. the data set for the defined plane can be determined). Taking the dot product of the plane equation and the corner coordinate can be used to determine this by converting any negative numbers to a one and any positive numbers to a zero. In one particular embodiment this is a 4-vector dot product using homogeneous coordinates. The resulting binary number is then used as key to retrieve the polygon data having a matching binary number (c.f. step S34 of FIG. 10).

It will be appreciated that calculation of the set of topologically possible polygons need only be performed once and in fact could be provided as a data file. Only the input vertex definitions of the polygon data which relates to the identified corner data set is processed by the vertex unit. Also, only the input vertex definitions for this plane/volume interaction need to be transferred and stored in the GPU memory, the other processing having been done on the CPU in certain embodiments.

In the described embodiments, a computer implementation employing computer program code for storage on a data carrier or in memory can be used to control operation of the CPU and GPU of the computer system. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

It will be appreciated that although particular embodiments of the invention have been described, many modifications/additions and/or substitutions may be made within the scope of the present invention. Accordingly the particular examples described are intended to be illustrative only, and not limitative.

REFERENCES

[1] Lichtenbelt, B., Crane, R. and Naqvi, S., "Introduction to Volume Rendering", Hewlett-Packard Company, Prentice-Hall PTR, New Jersey, 1998

What is claimed is:

1. An apparatus for rendering a two dimensional polygon image from volume data defining a volume and plane data defining a two dimensional plane which intersects the volume, the apparatus comprising a graphics processing unit (GPU), wherein:

(a) the apparatus is configured to generate triangle data comprising an indirect representation of the vertices of each triangle of a set of candidate triangles, wherein for a given plane/volume interaction a subset of the candidate triangles are valid triangles which are within the volume and on the given plane and the remaining triangles are invalid triangles;

(b) the GPU is configured to process the indirect representation of the vertices of each triangle of the set of candidate triangles to output for a valid triangle for the defined plane a direct representation of the valid triangle and to output for an invalid triangle for the defined plane a direct representation of a degenerate triangle;

(c) the GPU is configured to reject each direct representation of a degenerate triangle from further processing; and (d) the GPU is configured to process each direct representation of a valid triangle to form one or more triangle images which form the two dimensional polygon image; and wherein the direct representation of each triangle comprises a group of three output vertices, the output vertices for a valid triangle comprising three different values defining the corners of the triangle and the output vertices for an invalid triangle comprising at least two identical values, wherein the GPU is configured to perform operations (c) and (d) by:

(I) rejecting a group of three vertices comprising at least two identical values; and (ii) forming a triangle image from a group of three vertices comprising three different values;

wherein the GPU comprises a vertex unit,
wherein the indirect representation of the vertices of each triangle comprises a group of three input vertex definitions, each input vertex definition defining a line on or through the volume and also defining information to determine the validity of the triangle wherein for a valid triangle for a given plane/volume interaction the line defined by each input vertex definition intersects the plane, and
wherein the vertex unit is configured to process each input vertex definition to determine the validity of the triangle and for a valid triangle for the defined plane to output a respective output vertex by calculating and outputting the intersection point of the defined plane and the line defined by the input vertex definition.

2. An apparatus according to claim 1, wherein each input vertex definition defines the positions of a first and second pair of corners of the volume, each defining a line on or through the volume and wherein the vertex unit is configured to process each input vertex definition in turn to output a respective output vertex by:
(i) checking if the line between the first pair of corners intersects the plane;
(ii) checking if the line between the second pair of corners intersects the plane;
(iii) if checks (i) and (ii) determine that both lines intersect the plane, then calculating and outputting as the output vertex the intersection point for the first pair of corners; and
(iv) if checks (i) and (ii) determine that at least one of the lines does not intersect the plane then outputting as the output vertex a predetermined value.

3. An apparatus according to claim 2, wherein the vertex unit is configured to perform three iterations of operations (i) to (iv) to output a group of three output vertices, one iteration for each of the group of three input vertex definitions.

4. An apparatus according to claim 3, wherein:
(i) a first input vertex definition defines the positions of a first pair of corners defining a line along a first edge of a face of the volume and the positions of a second pair of corners defining a line along a second edge of the face of the volume;
(ii) a second input vertex definition defines the positions of a first pair of corners defining the line along the second edge and the positions of a second pair of corners defining the line along the first edge; and
(iii) a third input vertex definition defines the positions of a first pair of corners defining the line between opposite corners of the volume and the positions of a second pair of corners defining the same line.

5. An apparatus for rendering a two dimensional polygon image from volume data defining a volume and plane data defining a two dimensional plane which intersects the volume, the apparatus comprising a graphics processing unit (GPU), wherein:
(a) the apparatus is configured to generate triangle data comprising an indirect representation of the vertices of each triangle of a set of candidate triangles, wherein for a given plane/volume interaction a subset of the candidate triangles are valid triangles which are within the volume and on the given plane and the remaining triangles are invalid triangles;
(b) the GPU is configured to process the indirect representation of the vertices of each triangle of the set of candidate triangles to output for a valid triangle for the defined plane a direct representation of the valid triangle and to output for an invalid triangle for the defined plane a direct representation of a degenerate triangle;
(c) the GPU is configured to reject each direct representation of a degenerate triangle from further processing; and
(d) the GPU is configured to process each direct representation of a valid triangle to form one or more triangle images which form the two dimensional polygon image; and
wherein the indirect representation of each candidate triangle comprises a group of three input vertex definitions and each input vertex definition is in a flexible vertex format.

6. An apparatus according to claim 1, wherein the volume is in the shape of a right parallelpiped.

7. An apparatus according to claim 1, wherein the GPU has a GPU memory and the apparatus is configured to transfer the data representing the plane to the GPU memory as a constant.

8. An apparatus according to claim 1, wherein the apparatus is configured to notionally divide the volume data into a plurality of sub-volume data sets and the apparatus is configured to render a two dimensional polygon image for each sub-volume data set.

9. An apparatus for rendering a two dimensional polygon image from volume data defining a volume and plane data defining a two dimensional plane which intersects the volume, the apparatus comprising a graphics processing unit (GPU), wherein:
(a) the apparatus is configured to generate polygon data comprising for each topologically possible plane/volume interaction (I) a corner data set indicating for each corner of the volume whether the corner is one side or the other side of the plane and (ii) an indirect representation of the polygon formed by the plane/volume interaction;
(b) the apparatus is configured to determine the corner data set for the defined plane/volume interaction and to use it as a key to identify the corresponding indirect representation of a polygon from the polygon data;
(c) the GPU is configured to process the identified indirect representation of a polygon to output a direct representation of the polygon; and
(d) the GPU is configured to process the direct representation of the polygon to form the two dimensional polygon image.

10. An apparatus according to claim 9,
wherein the indirect representation of each polygon comprises an indirect representation of the vertices of one or more triangles which form the polygon, and
wherein the GPU is configured to perform operations (c) and (d) by processing the indirect representation of the vertices of each triangle of the identified indirect representation of a polygon.

11. An apparatus according to claim 10,
wherein the indirect representation of the vertices of each triangle comprises a group of three input vertex definitions, each input vertex definition defining the positions of a pair of corners of the volume which define a line along an edge of the volume, and
wherein the GPU comprises a vertex unit which is configured to process each input vertex definition in turn to output a respective output vertex by calculating and outputting the intersection point of the defined plane and the line defined by the input vertex definition.

12. An apparatus according to claim 9, wherein the apparatus is configured to generate the polygon data for each topologically possible plane/volume interaction by:
 (a) generating a set of all possible corner data sets comprising a mathematical representation of each mathematically possible combination of corners of the volume being one side or the other side of the plane, and
 (b) processing the set of all possible corner data sets to determine which of the corner data sets represent topologically possible plane/volume interactions and which of the corner data sets represent topologically impossible plane/volume interactions.

13. An apparatus according to claim 9, wherein the corner data set is an array of elements, each element representing a corner and storing either an indicator that the corner is one side of the plane or an indicator that the corner is the other side of the plane.

14. An apparatus according to claim 9,
 wherein the indirect representation of each polygon comprises an indirect representation of one or more triangles which form the polygon,
 wherein the indirect representation of the vertices of each triangle comprises a group of three input vertex definitions, and
 wherein each input vertex definition is in a flexible vertex format.

15. An apparatus according to claim 9, wherein the volume is in the shape of a right parallelpiped.

16. An apparatus according to claim 9, wherein the GPU has a GPU memory and the apparatus is configured to transfer the data representing the plane to the GPU memory as a constant.

17. An apparatus according to claim 9, wherein the apparatus is configured to notionally divide the volume data into a plurality of sub-volume data sets and the apparatus is configured to render a two dimensional polygon image for each sub-volume data set.

18. A method of using an apparatus comprising a graphics processing unit (GPU) to render a two dimensional polygon image from volume data defining a volume and plane data defining a two dimensional plane which intersects the volume, the method comprising the computer-implemented steps of:
 (a) generating triangle data comprising an indirect representation of the vertices of each triangle of a set of candidate triangles, wherein for a given plane/volume interaction a subset of the candidate triangles are valid triangles which are within the volume and on the given plane and the remaining triangles are invalid triangles;
 (b) using the GPU to process the indirect representation of the vertices of each triangle of the set of candidate triangles to output for a valid triangle for the defined plane a direct representation of the valid triangle and to output for an invalid triangle for the defined plane a direct representation of a degenerate triangle;
 (c) using the GPU to reject each direct representation of a degenerate triangle from further processing; and
 (d) using the GPU to process each direct representation of a valid triangle to form one or more triangle images which form the two dimensional polygon image; and
 wherein the direct representation of each triangle comprises a group of three output vertices, the output vertices for a valid triangle comprising three different values defining the corners of the triangle and the output vertices for an invalid triangle comprising at least two identical values, the method comprising using the GPU to perform operations (c) and (d) by:
 (I) rejecting a group of three vertices comprising at least two identical values; and
 (ii) forming a triangle image from a group of three vertices comprising three different values;
 wherein the GPU comprises a vertex unit,
 wherein the indirect representation of the vertices of each triangle comprises a group of three input vertex definitions, each input vertex definition defining a line on or through the volume and also defining information to determine the validity of the triangle, and
 wherein for a valid triangle for a given plane/volume interaction the line defined by each input vertex definition intersects the plane, and
 the method comprising using the vertex unit to process each input vertex definition to determine the validity of the triangle and for a valid triangle for the defined plane to output a respective output vertex by calculating and outputting the intersection point of the defined plane and the line defined by the input vertex definition.

19. A method according to claim 18, wherein each input vertex definition defines the positions of a first and second pair of corners of the volume, each defining a line on or through the volume, the method comprising using the vertex unit to process each input vertex definition in turn to output a respective output vertex by:
 (I) checking if the line between the first pair of corners intersects the plane;
 (ii) checking if the line between the second pair of corners intersects the plane;
 (iii) if checks (I) and (ii) determine that both lines intersect the plane, then calculating and outputting as the output vertex the intersection point for the first pair of corners; and
 (iv) if checks (I) and (ii) determine that at least one of the lines does not intersect the plane then outputting as the output vertex a predetermined value.

20. A method according to claim 19, comprising using the vertex unit to perform three iterations of operations (I) to (iv) to output a group of three output vertices, one iteration for each of the group of three input vertex definitions.

21. A method according to claim 20, wherein:
 (I) a first input vertex definition defines the positions of a first pair of corners defining a line along a first edge of a face of the volume and the positions of a second pair of corners defining a line along a second edge of the face of the volume;
 (ii) a second input vertex definition defines the positions of a first pair of corners defining the line along the second edge and the positions of a second pair of corners defining the line along the first edge; and
 (iii) a third input vertex definition defines the positions of a first pair of corners defining the line between opposite corners of the volume and the positions of a second pair of corners defining the same line.

22. A method of using an apparatus comprising a graphics processing unit (GPU) to render a two dimensional polygon image from volume data defining a volume and plane data defining a two dimensional plane which intersects the volume, the method comprising the computer-implemented steps of:
 (a) generating triangle data comprising an indirect representation of the vertices of each triangle of a set of candidate triangles, wherein for a given plane/volume interaction a subset of the candidate triangles are valid triangles which are within the volume and on the given plane and the remaining triangles are invalid triangles;

(b) using the GPU to process the indirect representation of the vertices of each triangle of the set of candidate triangles to output for a valid triangle for the defined plane a direct representation of the valid triangle and to output for an invalid triangle for the defined plane a direct representation of a degenerate triangle;

(c) using the GPU to reject each direct representation of a degenerate triangle from further processing; and (d) using the GPU to process each direct representation of a valid triangle to form one or more triangle images which form the two dimensional polygon image; and wherein the indirect representation of each candidate triangle comprises a group of three input vertex definitions and each input vertex definition is in a flexible vertex format.

23. A method according to claim 18, wherein the volume is in the shape of a right parallelpiped.

24. A method according to claim 18, wherein the GPU has a GPU memory and the method comprises transferring the data representing the plane to the GPU memory as a constant.

25. A method according to claim 18, comprising notionally dividing the volume data into a plurality of sub-volume data sets and rendering a two dimensional polygon image for each sub-volume data set.

26. A method of using an apparatus comprising a graphics processing unit (GPU) to render a two dimensional polygon image from volume data defining a volume and plane data defining a two dimensional plane which intersects the volume, the method comprising the computer-implemented steps of:

(a) generating polygon data comprising for each topologically possible plane/volume interaction (I) a corner data set indicating for each corner of the volume whether the corner is one side or the other side of the plane and (ii) an indirect representation of the polygon formed by the plane/volume interaction;

(b) determining the corner data set for the defined plane/volume interaction and using it as a key to identify the corresponding indirect representation of a polygon from the polygon data;

(c) using the GPU to process the identified indirect representation of a polygon to output a direct representation of the polygon; and (d) using the GPU to process the direct representation of the polygon to form the two dimensional polygon image.

27. A method according to claim 26, wherein the indirect representation of each polygon comprises an indirect representation of one or more triangles which form the polygon, the method comprising using the GPU to perform operations (c) and (d) by processing the indirect representation of the vertices of each triangle of the identified indirect representation of a polygon.

28. A method according to claim 27,
wherein the indirect representation of the vertices of each triangle comprises a group of three input vertex definitions, each input vertex definition defining the positions of a pair of corners of the volume which define a line along an edge of the volume, and wherein the GPU comprises a vertex unit, the method comprising using the vertex unit to process each input vertex definition in turn to output a respective output vertex by calculating and outputting the intersection point of the defined plane and the line defined by the input vertex definition.

29. A method according to claim 26, comprising using the apparatus to generate the polygon data for each topologically possible plane/volume interaction by:

(I) generating a set of all possible corner data sets comprising a mathematical representation of each mathematically possible combination of corners of the volume being one side or the other side of the plane, and (ii) processing the set of all possible corner data sets to determine which of the corner data sets represent topologically possible plane/volume interactions and which of the corner data sets represent topologically impossible plane/volume interactions.

30. A method according to claim 26, wherein the corner data set is a an array of elements, each element representing a corner and holding either an indicator that the corner is one side of the plane or an indicator that the corner is the other side of the plane.

31. A method according to claim 26,
wherein the indirect representation of each polygon comprises an indirect representation of one or more triangles which form the polygon, wherein the indirect representation of the vertices of each triangle comprises a group of three input vertex definitions, and wherein each input vertex definition is in a flexible vertex format.

32. A method according to claim 26, wherein the volume is in the shape of a right parallelpiped.

33. A method according to claim 26, wherein the GPU has a GPU memory and the method comprises transferring the data representing the plane to the GPU memory as a constant.

34. A method according to claim 26, comprising notionally dividing the volume data into a plurality of sub-volume data sets and rendering a two dimensional polygon image for each sub-volume data set.

35. A computer program product comprising machine readable instructions stored on a computer-readable carrier medium for implementing the method of claim 18.

36. A computer configured to perform the method of claim 18.

37. A computer program product comprising machine readable instructions stored on a computer-readable carrier medium for implementing the method of claim 26.

38. A computer configured to perform the method of claim 26.

* * * * *